US009498855B2

(12) United States Patent
Gordon et al.

(10) Patent No.: US 9,498,855 B2
(45) Date of Patent: Nov. 22, 2016

(54) REWORK SYSTEM FOR COMPOSITE STRUCTURES

(71) Applicant: The Boeing Company, Chicago, IL (US)

(72) Inventors: David Jonathan Gordon, Charleston, SC (US); Catalin T. Vrinceanu, Savannah, GA (US)

(73) Assignee: THE BOEING COMPANY, Chicago, IL (US)

(*) Notice: Subject to any disclaimer, the term of this patent is extended or adjusted under 35 U.S.C. 154(b) by 153 days.

(21) Appl. No.: 14/243,468

(22) Filed: Apr. 2, 2014

(65) Prior Publication Data
US 2015/0283655 A1 Oct. 8, 2015

(51) Int. Cl.
B23P 6/00 (2006.01)
B23P 11/02 (2006.01)
F16B 33/00 (2006.01)
F16B 4/00 (2006.01)
F16B 5/02 (2006.01)
F16B 19/02 (2006.01)

(52) U.S. Cl.
CPC ............ *B23P 11/025* (2013.01); *B23P 6/00* (2013.01); *F16B 4/006* (2013.01); *F16B 5/025* (2013.01); *F16B 33/00* (2013.01); *F16B 19/02* (2013.01); *Y10T 29/49865* (2015.01); *Y10T 29/53439* (2015.01)

(58) Field of Classification Search
CPC .......... B23P 11/025; B23P 11/027; F16B 4/006; Y10T 29/49865; Y10T 29/53439; Y10T 29/49718

USPC ..................... 29/896.42, 402.12
See application file for complete search history.

(56) References Cited

U.S. PATENT DOCUMENTS

| 3,579,805 | A | * | 5/1971 | Kast | ............... | B23P 11/025 |
| | | | | | | 148/529 |
| 4,048,898 | A | | 9/1977 | Salter | | |
| 4,405,256 | A | | 9/1983 | King, Jr. | | |
| 4,702,655 | A | * | 10/1987 | Kendall | ............. | F16B 19/1054 |
| | | | | | | 29/523 |

(Continued)

FOREIGN PATENT DOCUMENTS

| GB | 1201710 A | 8/1970 |
| WO | WO8701418 A1 | 3/1987 |

(Continued)

OTHER PUBLICATIONS

Extended European Search Report, dated Aug. 4, 2015, regarding Application No. EP15161979.8, 9 pages.

*Primary Examiner* — Jason L Vaughan
*Assistant Examiner* — Amanda Meneghini
(74) *Attorney, Agent, or Firm* — Yee & Associates, P.C.

(57) ABSTRACT

A method and apparatus for reworking a composite structure. A fastener is cooled from a first temperature to a second temperature at which a diameter of a post of the fastener is reduced by a desired amount. The post of the fastener is placed into a channel in a bushing such that a desired interference fit occurs when the fastener is at the first temperature. The bushing with the fastener is positioned in a hole in the composite structure. A gap is present between an outer surface of the bushing and an inner surface of the hole. A gap is also present between an end of the bushing and a second structure.

15 Claims, 19 Drawing Sheets

(56) References Cited

U.S. PATENT DOCUMENTS

| | | | | |
|---|---|---|---|---|
| 4,824,314 | A | * | 4/1989 | Stencel ................ F16B 33/006 |
| | | | | 411/378 |
| 5,018,920 | A | | 5/1991 | Speakman |
| 8,262,331 | B2 | * | 9/2012 | Toosky ................ F16B 33/004 |
| | | | | 411/361 |
| 2008/0078864 | A1 | | 4/2008 | Wilkerson et al. |
| 2008/0156941 | A1 | * | 7/2008 | Liu ....................... B21J 15/142 |
| | | | | 244/35 R |
| 2013/0232751 | A1 | | 9/2013 | Hertel et al. |
| 2013/0255856 | A1 | | 10/2013 | Whitworth et al. |

FOREIGN PATENT DOCUMENTS

| | | |
|---|---|---|
| WO | WO2009052325 A1 | 4/2009 |
| WO | WO2010115084 A1 | 10/2010 |
| WO | WO2011050040 A1 | 4/2011 |

\* cited by examiner

REWORK SYSTEM FOR COMPOSITE STRUCTURES

BACKGROUND INFORMATION

1. Field

The present disclosure relates generally to aircraft and, in particular, to composite structures for aircraft. Still more particularly, the present disclosure relates to a method and apparatus for installing a bushing and a fastener in a composite structure used in aircraft.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

In manufacturing composite structures, layers of composite material are typically laid up on a tool. The layers may be comprised of fibers in sheets. These sheets may take the form of fabrics, tape, tows, or other suitable forms. In some cases, resin may be infused or preimpregnated into the sheets. These types of sheets are commonly referred to as prepreg.

The different layers of prepreg are laid up in different orientations and different numbers of layers may be used depending on the thickness of the composite structure being manufactured. These layers may be laid up by hand or by using automated lamination equipment such as a tape laminating machine or a fiber placement system. After the different layers of composite material have been laid up on the tool, the layers of composite material may be consolidated and cured upon exposure to temperature and pressure, thus forming the final composite structure.

In some cases, inconsistencies may occur in composite structures during various stages of manufacturing and use. For example, inconsistencies in an aircraft composite structure may occur during manufacturing, transport, maintenance, in-service, or other stages of use. Examples of inconsistencies that may be present in a composite structure include voids, porosity, delamination, foreign object debris (FOD), an incorrectly drilled hole, cracks, and other types of inconsistencies.

These inconsistencies may occur in various parts of the composite structure. For example, delamination may occur near a fastener hole drilled in the composite structure. This delamination may be caused when one layer of composite material separates from another layer when the resin bonding the layers does not perform as desired. In another illustrative example, tooling of the composite structure may cause inconsistencies.

When inconsistencies are present, composite structures often need rework. The rework may include repair, replacement, or some combination thereof. For example, a portion of the composite structure may be replaced with a patch. In still other examples, a plug may be used to rework a fastener hole in the composite structure. In still other instances, the composite structure may be discarded and replaced with a new composite structure.

This rework reduces the availability of aircraft carrying passengers, cargo, or other items. These effects may be more costly and time-consuming than desired. Therefore, it would be desirable to have a method and apparatus that take into account at least some of the issues discussed above, as well as other possible issues.

SUMMARY

In one illustrative embodiment, a method for reworking a composite structure is presented. A fastener is cooled from a first temperature to a second temperature at which a diameter of a post of the fastener is reduced by a desired amount. The post of the fastener is placed into a channel in a bushing such that a desired interference fit occurs when the fastener is at the first temperature. The bushing with the fastener is positioned in a hole in the composite structure. A gap is present between an outer surface of the bushing and an inner surface of the hole.

In another illustrative embodiment, a system for reworking a composite structure comprises a fastener, a bushing, and a cooling system. The fastener has a post with a first diameter at a first temperature that is greater than a second diameter at a second temperature. The bushing has a channel configured to receive the post. The fastener and the bushing have a desired interference fit when the fastener is at the first temperature. The cooling system is configured to cool the fastener from the first temperature to the second temperature. The bushing with the fastener is positioned in a hole of the composite structure with a gap between the bushing and the composite structure to rework the composite structure.

In yet another illustrative embodiment, a method for installing a fastener system is provided. A temperature of a first component in a fastener system is changed with respect to a second component in the fastener system. The first component and the second component are placed relative to each other to form the fastener system such that the first component has a desired interference fit with the second component. The fastener system is positioned in a hole in a composite structure. A gap is present between an outer surface of the fastener system and an inner surface of the hole.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it is desirable to reduce the time needed to rework a composite structure when inconsistencies develop in the composite structure. As an example, the illustrative embodiments recognize and take into account that it is desirable to increase the speed at which an inconsistency located near a fastener hole in the composite structure is reworked. This inconsistency may be a result of processes encountered during manufacturing of the composite structure, use of the composite structure, former rework, or a combination thereof.

The illustrative embodiments also recognize and take into account that installing interference fit fasteners in a composite structure may cause inconsistencies to develop in the composite structure or inconsistencies currently present in the composite structure to increase. In this illustrative example, an "interference fit" fastener may have a post with a diameter that is greater than the diameter of the cylindrical portion of the hole in which it is installed. Friction between the post and the cylindrical portion of the hole holds the fastener in place.

In addition, the illustrative embodiments recognize and take into account that installing interference fit fasteners in the composite structure may cause new inconsistencies to form. These new inconsistencies may result in further rework or discarding of the composite structure.

Thus, the illustrative embodiments provide a method and apparatus for reworking a composite structure when an inconsistency is present in the composite structure. The method and apparatus may also be used to install fasteners in a composite structure when an inconsistency is not present.

In one illustrative embodiment, a fastener is cooled from a first temperature to a second temperature at which a diameter of a post of the fastener is reduced by a desired amount. The post of the fastener is placed into a channel in a bushing such that a desired interference fit occurs when the fastener is at the first temperature. The bushing with the fastener is positioned in a hole in a composite structure. A gap is present between the outer surface of the bushing and the inner surface of the hole.

Figure 1:
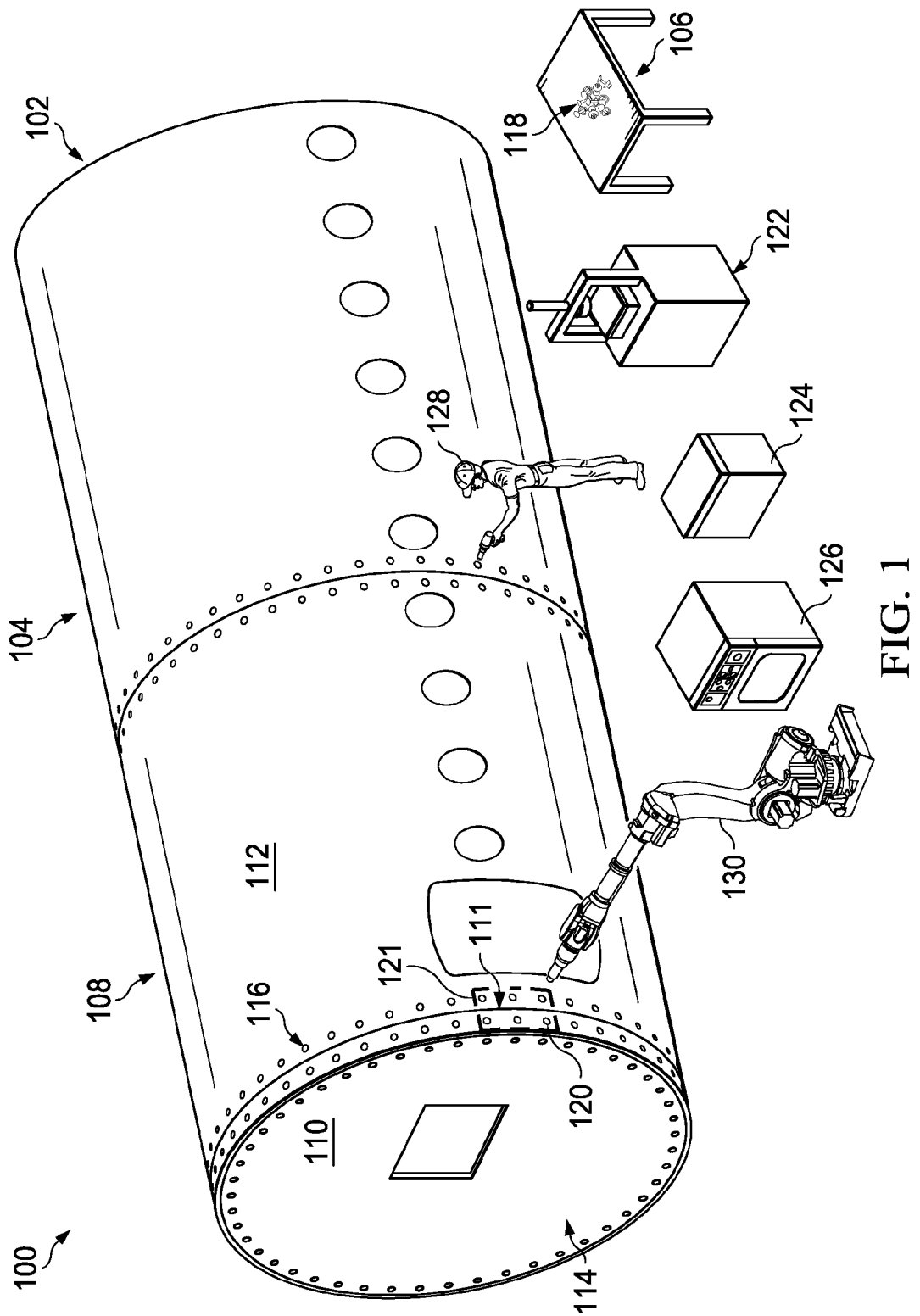
FIG. 1 is an illustration of a manufacturing environment in accordance with an illustrative embodiment.

Referring now to the figures and, in particular, with reference to FIG. 1, an illustration of a manufacturing environment is depicted in accordance with an illustrative embodiment. In this depicted example, manufacturing environment 100 is an example of one environment in which aircraft 102 is formed.

In this illustrative example, fuselage section 104 of aircraft 102 may be formed in manufacturing environment 100. Components within fuselage section 104 of aircraft 102 are joined together using fastener systems 106.

As depicted, fastener systems 106 are mechanical assemblies used to join composite structure 108 with second structure 110 to form fuselage section 104 of aircraft 102. Composite structure 108 and second structure 110 are joined at joint 111.

In this illustrative example, composite structure 108 is an object formed from two or more layers of composite material. Composite structure 108 may comprise one or more materials selected from at least one of a thermoset material, a thermoplastic material, a carbon-fiber reinforced polymer (CFRP), or some other suitable type of composite material.

As used herein, phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Composite structure 108 takes various forms in this illustrative example. For instance, composite structure 108 may be selected from one of a skin panel, a frame, a stringer, a floor panel, a door, a vent, a reservoir, a bulkhead, a compartment, a control surface, and other suitable types of composite structures. In this illustrative example, composite structure 108 takes the form of skin panel 112 used to form a portion of fuselage section 104 of aircraft 102.

In this depicted example, second structure 110 is an object attached to composite structure 108 using fastener systems 106. Second structure 110 takes various forms in this illustrative example. For example, second structure 110 may be selected from one of a composite structure, a metal structure, a structural member, and other suitable types of structures. Second structure 110 takes the form of bulkhead 114 in this illustrative example.

Bulkhead 114 is a support structure that forms a partition in fuselage section 104 of aircraft 102. Bulkhead 114 may separate the rear of a passenger cabin of aircraft 102 and unpressurized portions of fuselage section 104 of aircraft 102 in this illustrative example. In this manner, bulkhead 114 may be an aft pressure bulkhead.

As illustrated, fastener systems 106 are positioned in holes 116 in composite structure 108. In this illustrative example, fastener systems 106 includes fastener system 118. Fastener system 118 corresponds with hole 120. Hole 120 is shown in section 121 in this illustrative example.

In this depicted example, hole 120 is drilled through both composite structure 108 and second structure 110. In some cases, hole 120 may be drilled in an undesired manner in composite structure 108. In one illustrative example, hole 120 may be larger than desired. In this case, the size of fastener system 118 may be selected to fill hole 120.

As depicted, fastener system 118 includes a fastener and a bushing. In some examples, fastener system 118 also may include one or more nuts, washers, spacers, and other components.

Prior to being placed in hole 120, fastener system 118 is formed using at least one of tool 122, cooling system 124, or heating system 126. In this illustrative example, tool 122 is configured to press the components of fastener system 118 together.

Tool 122 takes the form of a press in this illustrative example. For instance, tool 122 may be an arbor press or some other suitable tool.

Tool 122 is configured to apply a force to the components within fastener system 118 to form a desired interference fit between components. In this illustrative example, an interference fit is an engagement between two components which is achieved by friction after the two components are pushed together.

An interference fit is often used when one component, such as a post of a fastener, is larger than a second component, such as a channel in a bushing. In some illustrative examples, the temperature of at least one of the components in fastener system 118 may be changed prior to using tool 122.

As depicted, cooling system 124 and heating system 126 are used to change the size of one or more components in fastener system 118 such that fastener system 118 may be formed using less force. In this illustrative example, cooling system 124 is a device configured to decrease the diameter of a first component in fastener system 118 before the first component is engaged with a second component. Cooling system 124 comprises at least one of dry ice, liquid nitrogen, a refrigerant, a cooler, a refrigeration unit, cooled air, or some other suitable type of cooling system.

In this depicted example, heating system 126 is a device configured to increase the diameter of a first component in fastener system 118 before engaging the first component with a second component. Heating system 126 comprises at least one of an oven, a furnace, or some other suitable type of heating system.

Cooling system 124 and heating system 126 may be used individually or in combination. For example, a fastener may be cooled and the bushing may be heated at the same time. An interference fit may then be formed between the fastener and the bushing. The arrangement of these components forms fastener system 118 in the illustrative example.

In this illustrative example, human operator 128, robotic operator 130, or both, may position fastener systems 106 in holes 116 in fuselage section 104 of aircraft 102. Robotic operator 130 is a device that is configured to perform operations in response to instructions by a controller. The controller may be hardware in this illustrative example, but may include firmware or software in other illustrative examples. As an example, the controller may be a processor unit or a computer system and may receive input from human operator 128. Robotic operator 130 may take the form of, for example, without limitation, a robotic arm.

Human operator 128, robotic operator 130, or both, also may perform other operations to form fuselage section 104 of aircraft 102 in this illustrative example. These operations include, for example, without limitation, drilling holes 116, forming fastener system 118 using tool 122, operating at least one of cooling system 124 or heating system 126, and performing other suitable operations in manufacturing environment 100.

Figure 2:
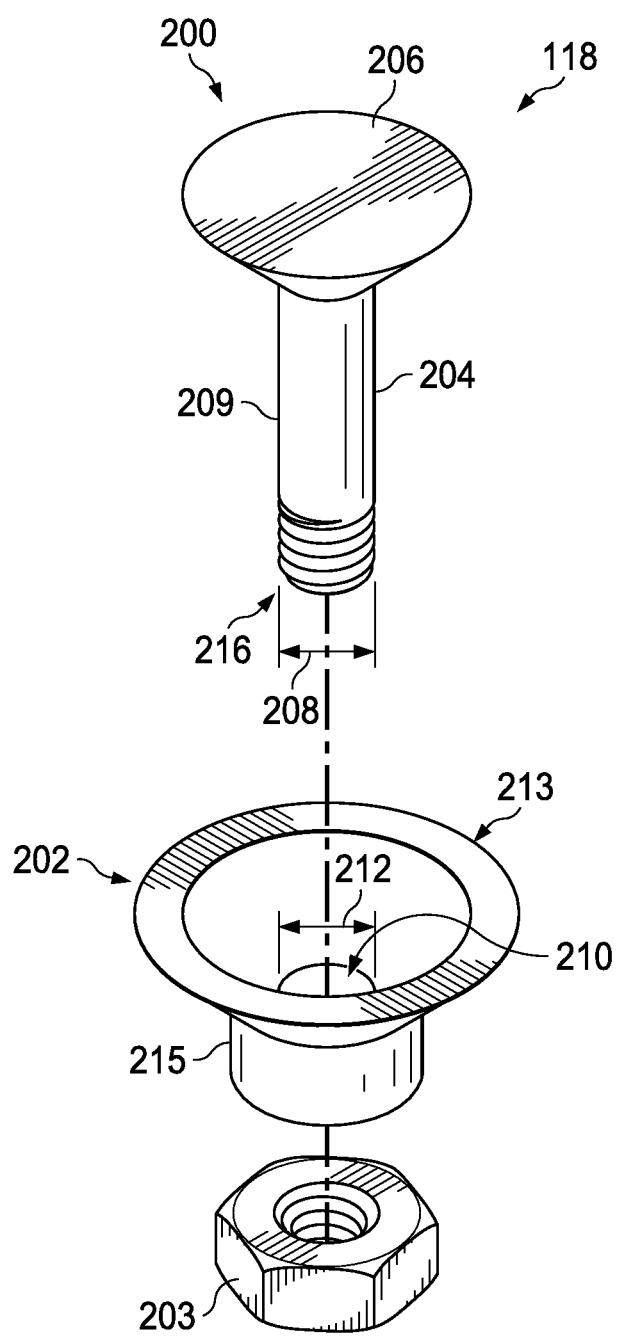
FIG. 2 is an illustration of an exploded view of a fastener system in accordance with an illustrative embodiment.

Turning next to FIG. 2, an illustration of an exploded view of a fastener system is depicted in accordance with an illustrative embodiment. In this depicted example, an exploded view of fastener system 118 from FIG. 1 is shown.

As depicted, fastener system 118 includes fastener 200, bushing 202, and nut 203. Fastener 200 is a device that mechanically connects composite structure 108 to second structure 110 in FIG. 1 by tightening nut 203 on fastener 200.

Fastener 200 may take different forms in this illustrative example. For instance, fastener 200 may be selected from one of a bolt, a screw, a rivet, a hexdrive, a lockbolt, a tapered sleeved bolt, and other suitable types of fasteners.

In this depicted example, fastener 200 has post 204 and head 206. Post 204 is a cylindrical portion of fastener 200. Post 204 has diameter 208 in this illustrative example. Nut 203 is a mechanical structure positioned on post 204 to tighten fastener system 118.

Post 204 has outer surface 209. Outer surface 209 may include a coating in some illustrative examples. This coating may be selected from one of a paint, an adhesive, a dielectric material, or some other suitable coating.

In this depicted example, head 206 is larger than post 204. In this illustrative example, head 206 is configured to lie substantially flush with an outer surface of composite structure 108 when fastener system 118 is installed in hole 120 in FIG. 1.

As illustrated, fastener 200 comprises a material selected from one of a metal, a metal alloy, and other suitable types of materials. The material for fastener 200 is selected such that fastener 200 has a positive coefficient of thermal expansion. A coefficient of thermal expansion describes the manner in which the size of an object responds to a change in the temperature of the object. In this illustrative example, a positive coefficient of thermal expansion indicates that fastener system 118 decreases in size when cooled and increases in size when heated.

As illustrated, bushing 202 is a mechanical device in fastener system 118 configured to receive fastener 200. Bushing 202 has channel 210 configured to receive post 204 of fastener 200. Channel 210 has diameter 212.

In this illustrative example, bushing 202 has shape 213. Shape 213 corresponds to the shape of hole 120 from FIG. 1. Outer surface 215 of bushing 202 interfaces with an inner surface of hole 120 in this illustrative example.

Bushing 202 comprises one or more materials selected from at least one of a metal, a metal alloy, or another suitable type of material. The material selected for fastener 200 and bushing 202 may be the same type of material or a different type of material. The material selected for bushing 202 also has a positive coefficient of thermal expansion in this illustrative example.

As depicted, fastener 200 is configured to form an interference fit with bushing 202. Diameter 208 of post 204 of fastener 200 is greater than diameter 212 of channel 210. To achieve a desired interference fit, in which friction prevents fastener 200 from separating from bushing 202, post 204 of fastener 200 is pressed into channel 210 of bushing 202 using tool 122 in FIG. 1.

The desired interference fit may be based on the type of material chosen for fastener 200. For instance, when the material for fastener 200 is 15-5PH stainless steel, the desired interference fit may be about 0.19% to about 0.25% of the diameter of channel 210 in bushing 202.

In other illustrative examples, the desired interference fit has other values, depending on the particular implementation and the materials used. The values may be selected such that bushing 202 with fastener 200 acts as a unit when installed in hole 120. In this manner, bushing 202 with fastener 200 acts as a unit with enough hoop stress from the interference fit to keep the parts permanently attached.

In some illustrative examples, the use of tool 122 to form an interference fit between fastener 200 with bushing 202 may cause deformation in at least one of fastener 200 or bushing 202. For instance, the force used by tool 122 may cause bushing 202 to bend in an undesired manner.

In another illustrative example, the force needed to form an interference fit between post 204 of fastener 200 and bushing 202 may cause an indention in head 206 of fastener 200. This indention is undesirable, as it may decrease the aerodynamic performance of aircraft 102, the structural integrity of fastener 200, or a combination thereof. In still another illustrative example, the force used by tool 122 may strip a coating from outer surface 209 of post 204.

To reduce deformation of fastener 200, bushing 202, or both, the temperature of at least one of these components is changed prior to using tool 122. Because the material selected for fastener 200 has a positive coefficient of thermal expansion, cooling system 124 from FIG. 1 is used to decrease diameter 208 of post 204 of fastener 200 by a desired amount such that post 204 fits more easily into channel 210 of bushing 202. Alternatively or in combination, heating system 126 is used to increase diameter 212 of channel 210 such that post 204 of fastener 200 fits more easily into channel 210.

In this illustrative example, diameter 208 is first diameter 216. First diameter 216 is a diameter for post 204 at a first temperature. The first temperature may be an ambient temperature, such as the temperature within manufacturing environment 100 in FIG. 1.

At the first temperature, first diameter 216 of post 204 is greater than diameter 212 of channel 210 in bushing 202. As a result, at least one of first diameter 216 of post 204 or diameter 212 of channel 210 needs to be changed such that post 204 can more easily be engaged with channel 210 of bushing 202.

Figure 3:
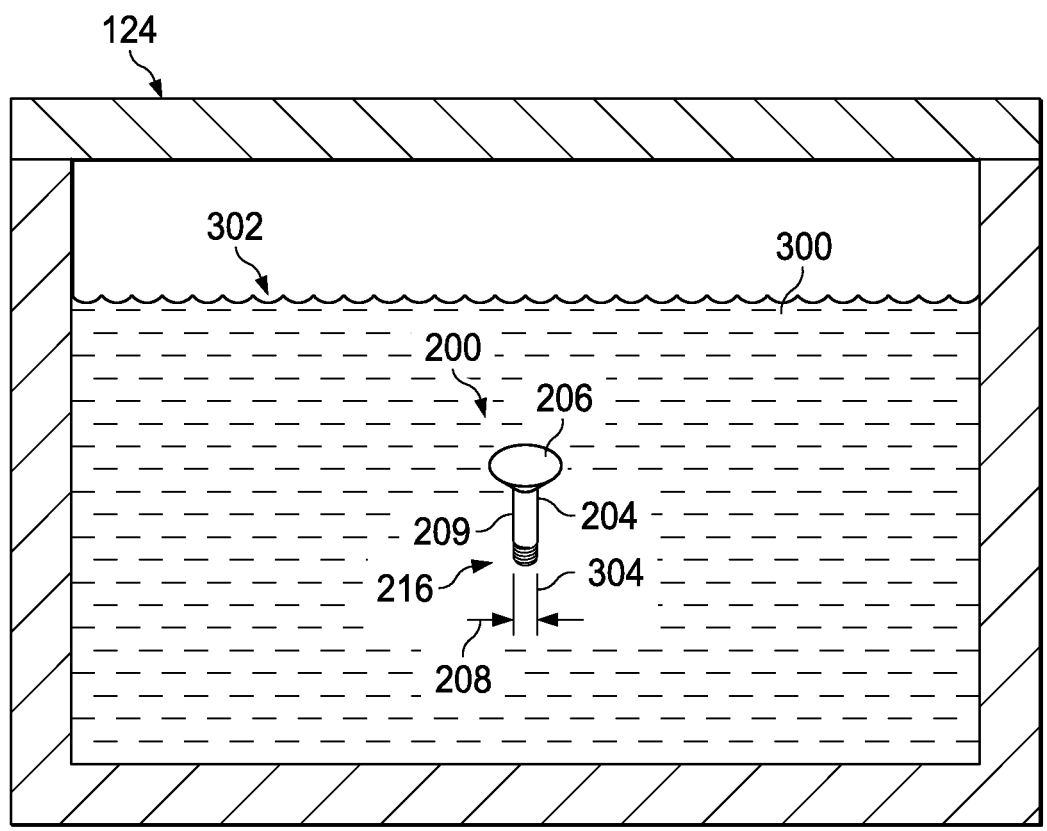
FIG. 3 is an illustration of a fastener and a cooling system in accordance with an illustrative embodiment.

With reference next to FIG. 3, an illustration of a fastener and a cooling system is depicted in accordance with an illustrative embodiment. In this depicted example, fastener 200 is cooled by cooling system 124.

As illustrated, cooling system 124 cools fastener 200 from the first temperature to a second temperature. Cooling system 124 has chamber 300 with liquid nitrogen 302 in chamber 300 in this illustrative example.

In this depicted example, fastener 200 is immersed in chamber 300 with liquid nitrogen 302. Liquid nitrogen 302 cools post 204 of fastener 200 to decrease diameter 208 by a desired amount.

Specifically, liquid nitrogen 302 decreases diameter 208 of post 204 from first diameter 216 to second diameter 304. Second diameter 304 is a diameter for post 204 that more easily fits within channel 210 of bushing 202.

Fastener 200 is immersed in liquid nitrogen 302 for a period of time until post 204 reaches second diameter 304. For example, without limitation, fastener 200 may be immersed in liquid nitrogen 302 for about ten minutes. Both the period of time needed to reach second diameter 304 and the diameter selected for second diameter 304 are dependent on the type of material used for fastener 200, external or internal guidelines, or other suitable parameters or combinations of parameters.

Figure 4:
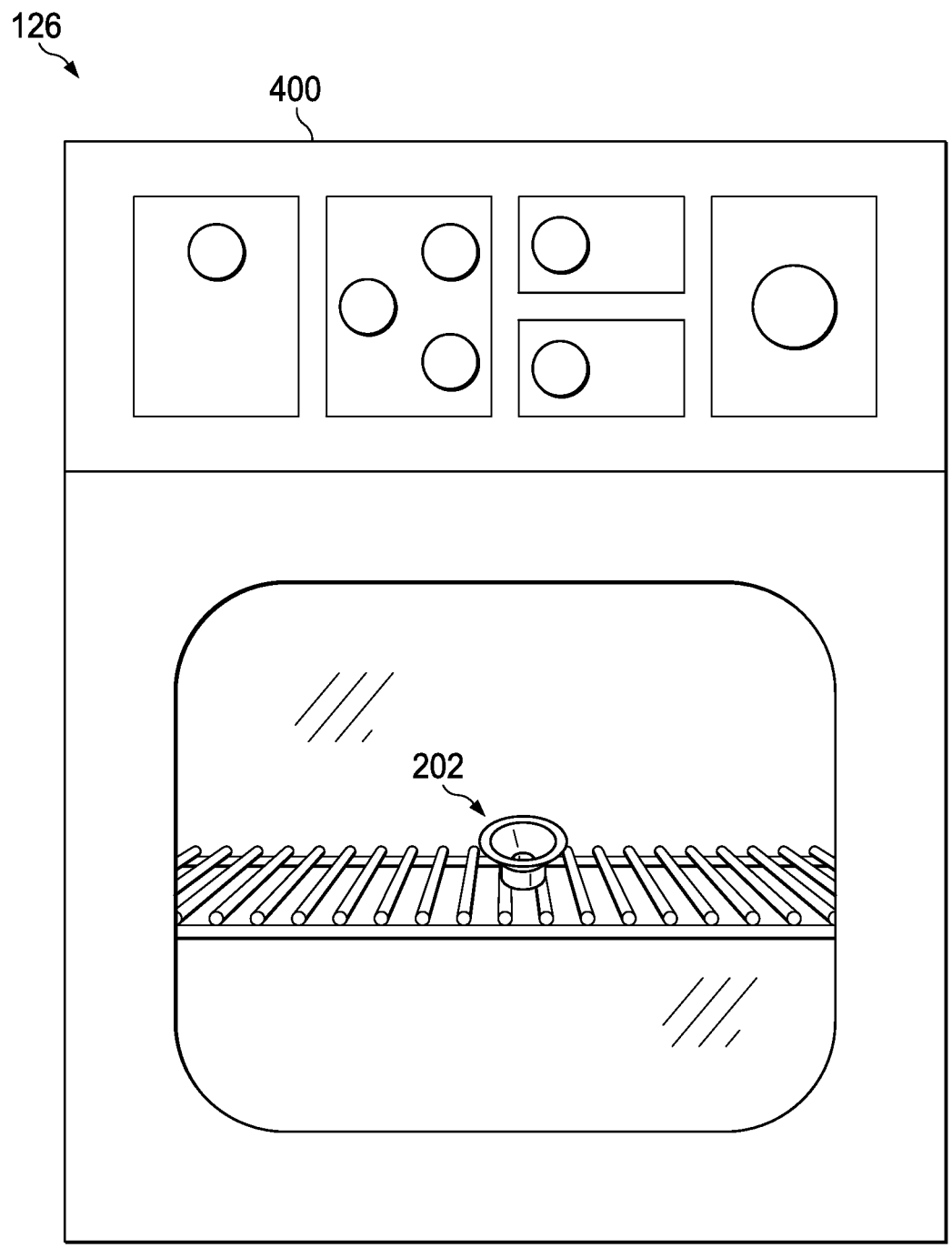
FIG. 4 is an illustration of a bushing and a heating system in accordance with an illustrative embodiment.

In FIG. 4, an illustration of a bushing and a heating system is depicted in accordance with an illustrative embodiment. In this depicted example, bushing 202 is heated using heating system 126 from FIG. 1.

Heating system 126 includes oven 400 in this illustrative example. Bushing 202 has been placed in oven 400 to increase the temperature of bushing 202 from the first temperature to a third temperature. At the third temperature, diameter 212 of channel 210 shown in FIG. 2 increases due to the positive coefficient of the thermal expansion of bushing 202.

In this illustrative example, bushing 202 is placed in oven 400 for about 30 minutes at a temperature of about 200 degrees Fahrenheit to about 400 degrees Fahrenheit. The temperature of oven 400 and the time period in which bushing 202 is placed in oven 400 may be reduced or increased depending on the type of material selected for bushing 202, the size of post 204, other suitable parameters or a combination of parameters. With an increase in diameter 212 of channel 210, post 204 may be pressed into channel 210 of bushing 202 more easily than when both fastener 200 and bushing 202 are at the first temperature.

An illustration of cooling system 124 and heating system 126 in FIG. 3 and FIG. 4, respectively, are only examples of some implementations for a heating system and cooling system that may be used in accordance with an illustrative embodiment. For example, a container with dry ice also may be used in some illustrative examples to implement a cooling system for fastener 200. As another example, a small furnace may be used to implement a heating system for bushing 202. Any suitable cooling and heating system may be used that causes fastener 200 and bushing 202 to reach to a desired temperature.

Figure 5:
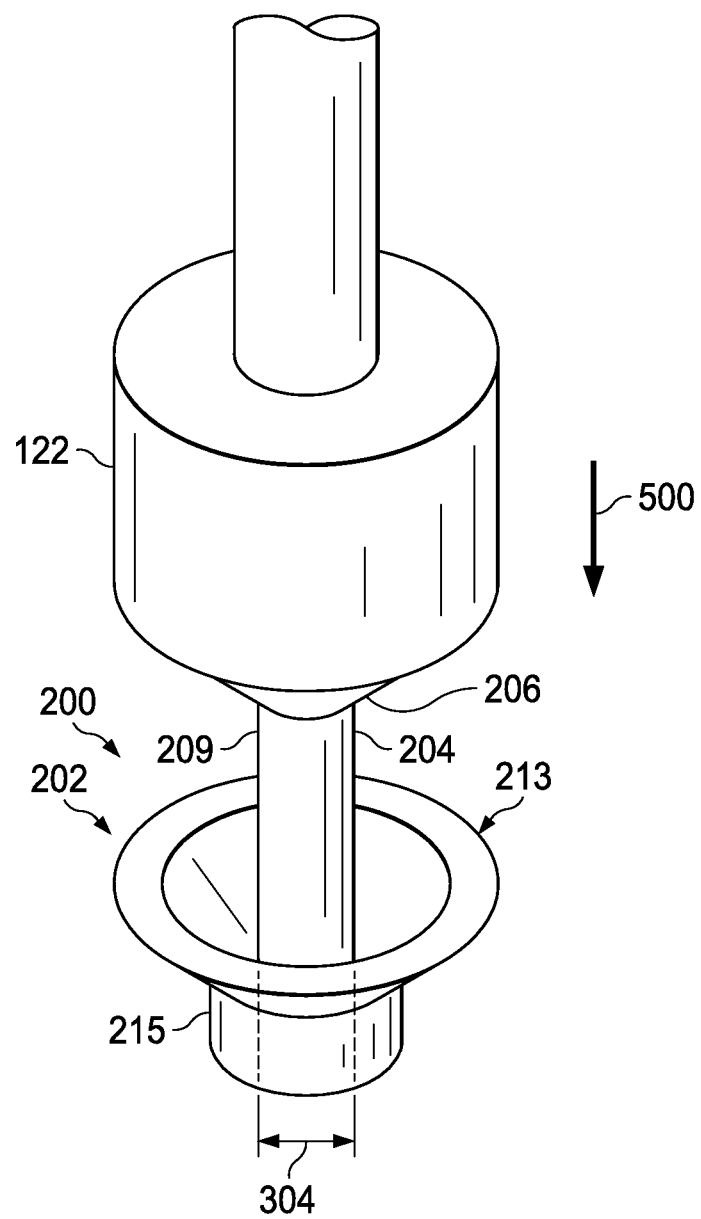
FIG. 5 is an illustration of a fastener system and a tool in accordance with an illustrative embodiment.

With reference next to FIG. 5, an illustration of a fastener system and a tool is depicted in accordance with an illustrative embodiment. In this depicted example, the diameter of at least one of post 204 of fastener 200 or channel 210 of bushing 202 has changed using cooling system 124 or heating system 126, respectively, as shown in FIGS. 3-4.

Immediately after the temperature change occurs, tool 122 is used to press post 204 of fastener 200 into bushing 202 to achieve a desired interference fit between post 204 and bushing 202. Tool 122 applies a force in the direction of arrow 500 to press post 204 of fastener 200 into channel 210 of bushing 202. The force exerted by tool 122 may be selected based on the ability to seat bushing 202 on fastener 200.

Figure 6:
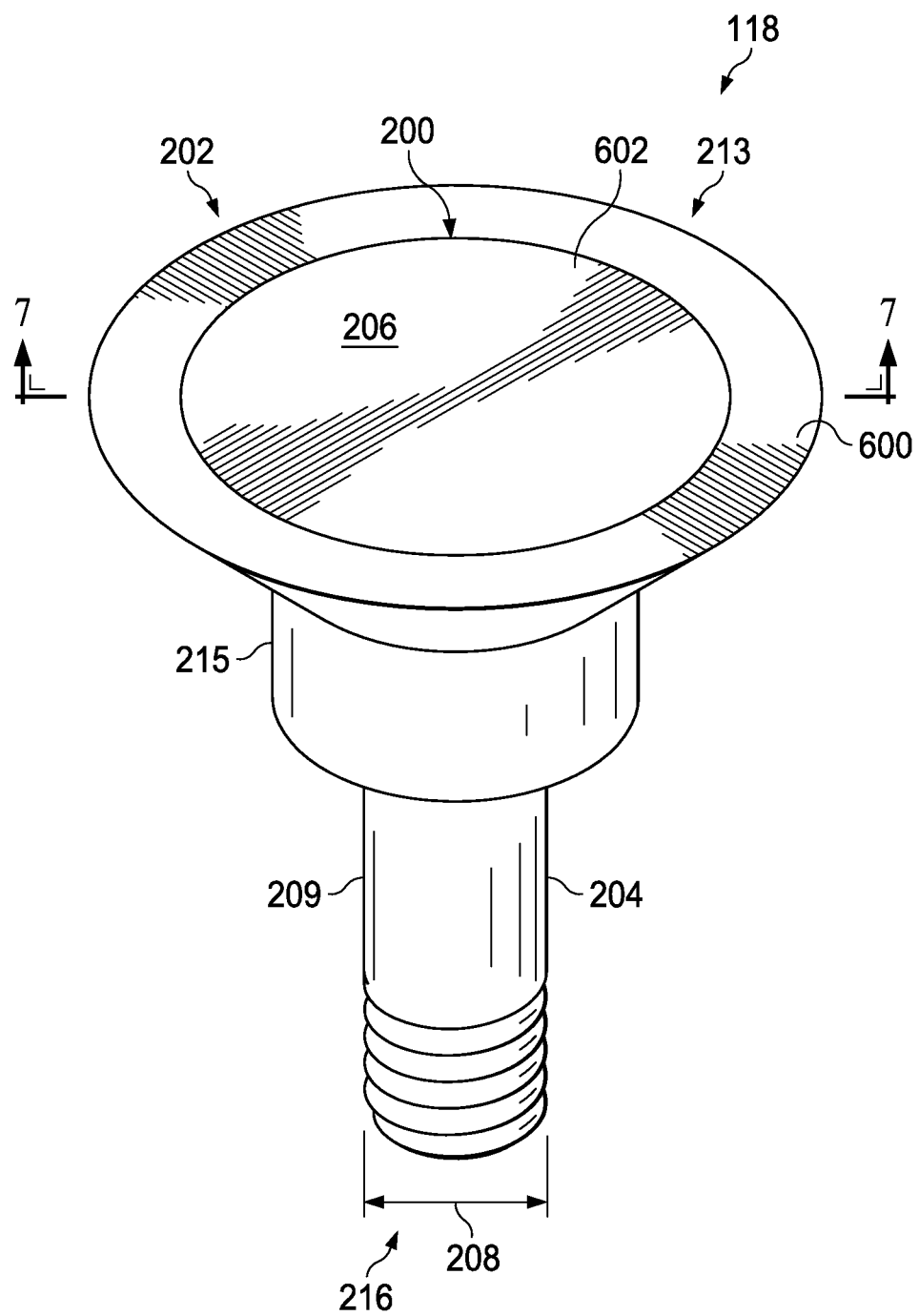
FIG. 6 is an illustration of a fastener system in accordance with an illustrative embodiment.

Turning next to FIG. 6, an illustration of a fastener system is depicted in accordance with an illustrative embodiment. In this depicted example, fastener system 118 is shown with fastener 200 having a desired interference fit with bushing 202. The temperature of both fastener 200 and bushing 202 has returned to an ambient temperature such that the desired interference fit between fastener 200 and bushing 202 is achieved.

In this illustrative example, surface 600 of bushing 202 lies substantially flush with surface 602 of head 206 of fastener 200 within selected tolerances. These selected tolerances may result in surface 602 of head 206 of fastener 200 being within about −0.005 to about 0.002 inches, recessed or proud, from surface 600 of bushing 202. In this manner, fastener system 118 lies substantially flush with the surface of composite structure 108 within selected tolerances when installed in hole 120 shown in FIG. 1.

Figure 7:
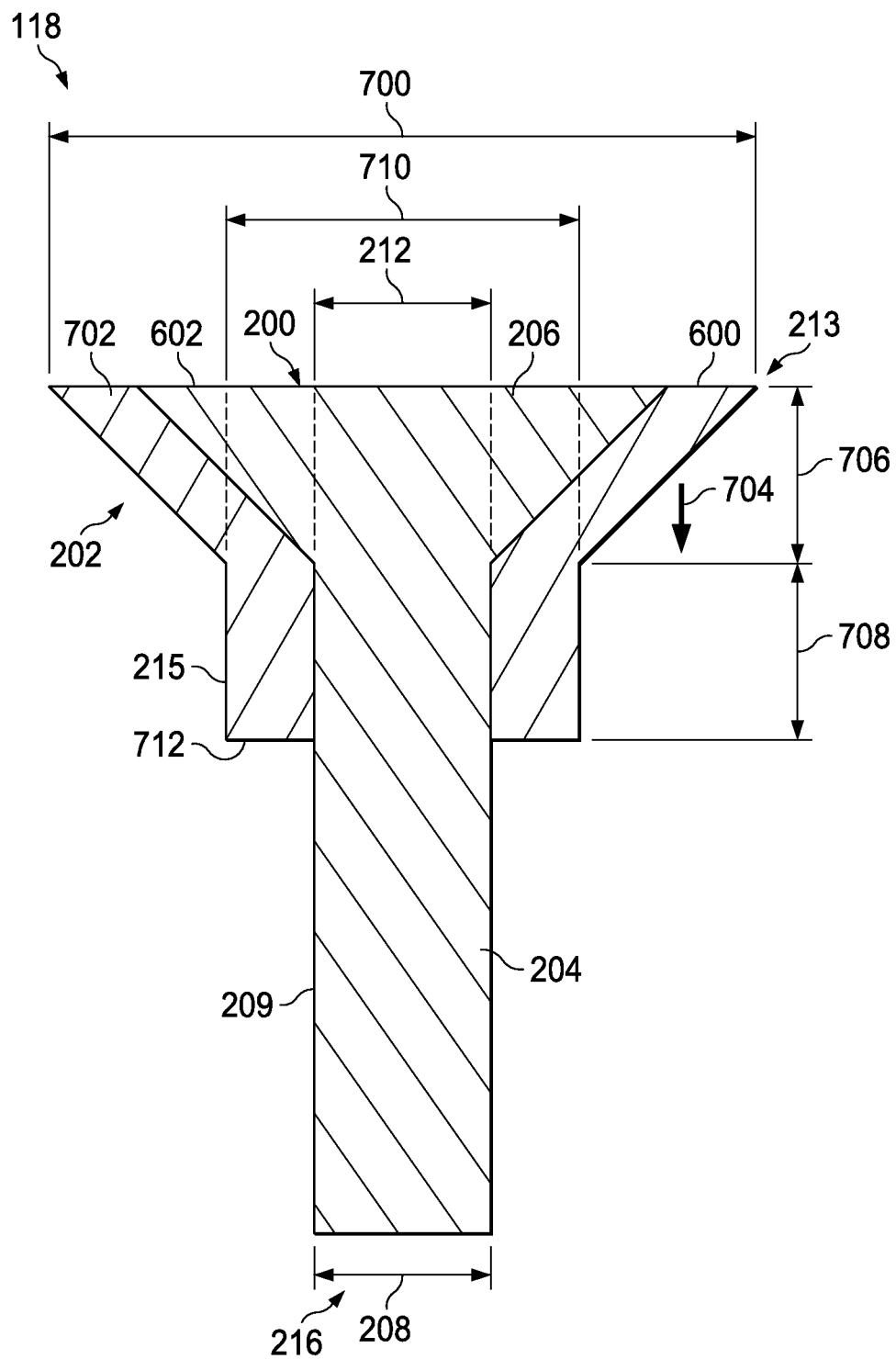
FIG. 7 is an illustration of a cross-sectional view of a fastener system in accordance with an illustrative embodiment.

With reference now to FIG. 7, an illustration of a cross-sectional view of a fastener system is depicted in accordance with an illustrative embodiment. In this depicted example, a cross-sectional view of fastener system 118 taken along lines 7-7 in FIG. 6 is shown.

As illustrated, fastener system 118 has diameter 700 at first end 702 of bushing 202. Diameter 700 tapers in the direction of arrow 704 in section 706 of bushing 202 in this illustrative example. In other words, diameter 700 of fastener system 118 gradually decreases from first end 702. The decrease in diameter 700 of fastener system 118 corresponds to the diameter of hole 120 shown in FIG. 1 such that fastener system 118 fits within hole 120 with a desired amount of clearance.

In this illustrative example, section 708 of fastener system 118 has diameter 710. Diameter 710 represents the diameter of fastener system 118 at second end 712 of bushing 202 in this illustrative example.

Figure 8:
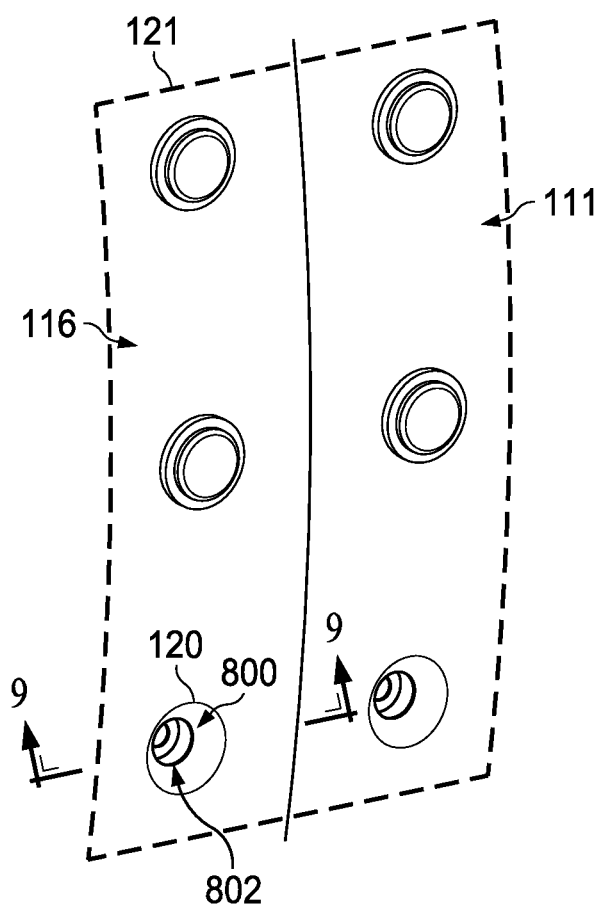
FIG. 8 is an illustration of a section of a joint in accordance with an illustrative embodiment.

Referring next to FIG. 8, an illustration of a section of a joint is depicted in accordance with an illustrative embodiment. In this depicted example, the components within section 121 of joint 111 of fuselage section 104 in aircraft 102 from FIG. 1 are shown in greater detail.

As depicted, hole 120 includes countersink 800. Countersink 800 is a conical portion of hole 120 cut into composite structure 108 shown in FIG. 1. Countersink 800 has a shape that corresponds to section 706 of fastener system 118 shown in FIG. 7. Countersink 800 is formed such that fastener system 118 sits substantially flush with the surface of composite structure 108 when installed in hole 120.

Inner surface 802 of hole 120 is also seen in this view. Inner surface 802 of hole 120 interfaces with outer surface 215 of bushing 202 from FIG. 2 in this illustrative example.

Figure 9:
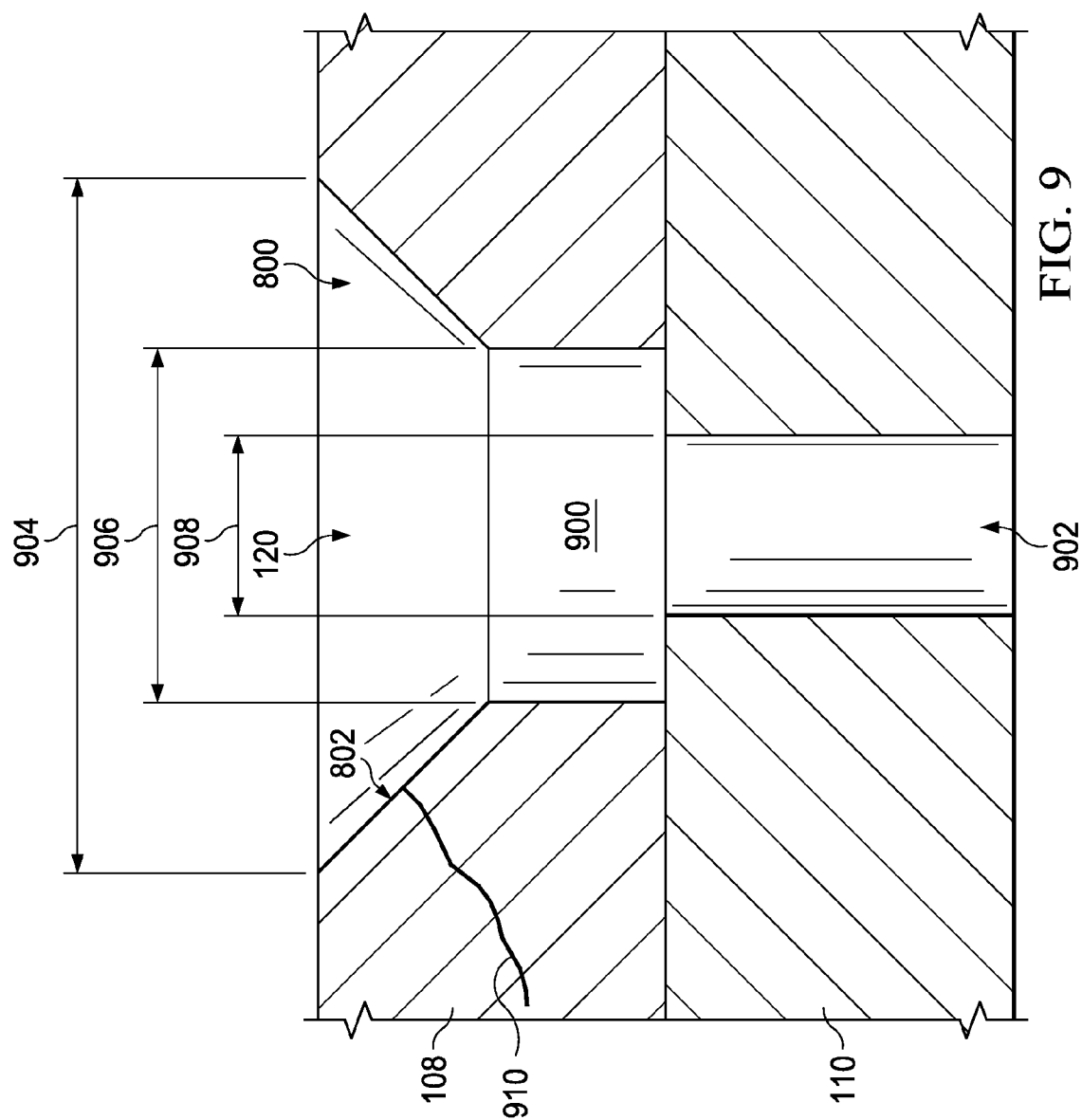
FIG. 9 is an illustration of a cross-sectional view of a hole in accordance with an illustrative embodiment.

Turning now to FIG. 9, an illustration of a cross-sectional view of a hole is depicted in accordance with an illustrative embodiment. In this depicted example, a cross-sectional view of hole 120 taken along lines 9-9 in FIG. 8 is shown.

As illustrated, hole 120 extends through composite structure 108 and second structure 110. Specifically, countersink 800 and channel 900 of hole 120 are drilled in composite structure 108. Channel 902 of hole 120 is drilled in second structure 110.

In this illustrative example, countersink 800 and channel 900 of hole 120 receive bushing 202 with fastener 200 shown in FIG. 2. Channel 902 of hole 120 receives post 204 of fastener 200 shown in FIG. 2.

As depicted, countersink 800 has diameter 904. Countersink 800 receives section 706 of fastener system 118 shown in FIG. 7.

Diameter 904 is a tapered diameter in this illustrative example. Diameter 904 of countersink 800 tapers in the same manner as diameter 700 of section 706 of fastener system 118. Diameter 904 of countersink 800 is larger than diameter 700 of section 706 of fastener system 118 in this illustrative example.

Channel 900 has diameter 906. Channel 900 is configured to receive section 708 of fastener system 118. Diameter 906 is larger than diameter 710 of section 708 of fastener system 118.

In this illustrative example, channel 902 has diameter 908. Diameter 908 is larger than diameter 208 of post 204 of fastener 200.

As depicted, each of diameter 904, diameter 906, and diameter 908 are larger than the corresponding diameter of fastener system 118 by substantially the same amount. In this manner, a desired amount of clearance is present between the outer surface of fastener system 118 and the inner surface of hole 120. As a result, fastener system 118 may be placed in hole 120 without having to form an interference fit between fastener system 118 and hole 120.

In this illustrative example, inconsistency 910 is present in composite structure 108. Inconsistency 910 may take the form of delamination, a crack, debris, and other types of inconsistencies. When inconsistency 910 is delamination, one or more layers in composite structure 108 may have separated from one another.

Inconsistency 910 occurs in various ways. As an example, operations performed on composite structure 108 may cause inconsistency 910 to form. For instance, drilling hole 120 in composite structure 108 may result in inconsistency 910. In another illustrative example, inconsistency 910 occurs from use of composite structure 108. In still other illustrative examples, inconsistency 910 occurs during formation of composite structure 108.

In this depicted example, inconsistency 910 affects the performance of composite structure 108 in an undesired manner. For example, without limitation, inconsistency 910 may reduce the structural integrity of composite structure 108.

In some cases, if inconsistency 910 is already present in composite structure 108, inconsistency 910 may be increased as operations are performed to manufacture or rework composite structure 108. For instance, forming hole 120 in composite structure 108 may cause inconsistency 910 to spread. In other illustrative examples, operation of aircraft 102 with composite structure 108 causes inconsistency 910 to increase. Without rework, aircraft 102 with inconsistency 910 near hole 120 may not be returned to service.

Figure 10:
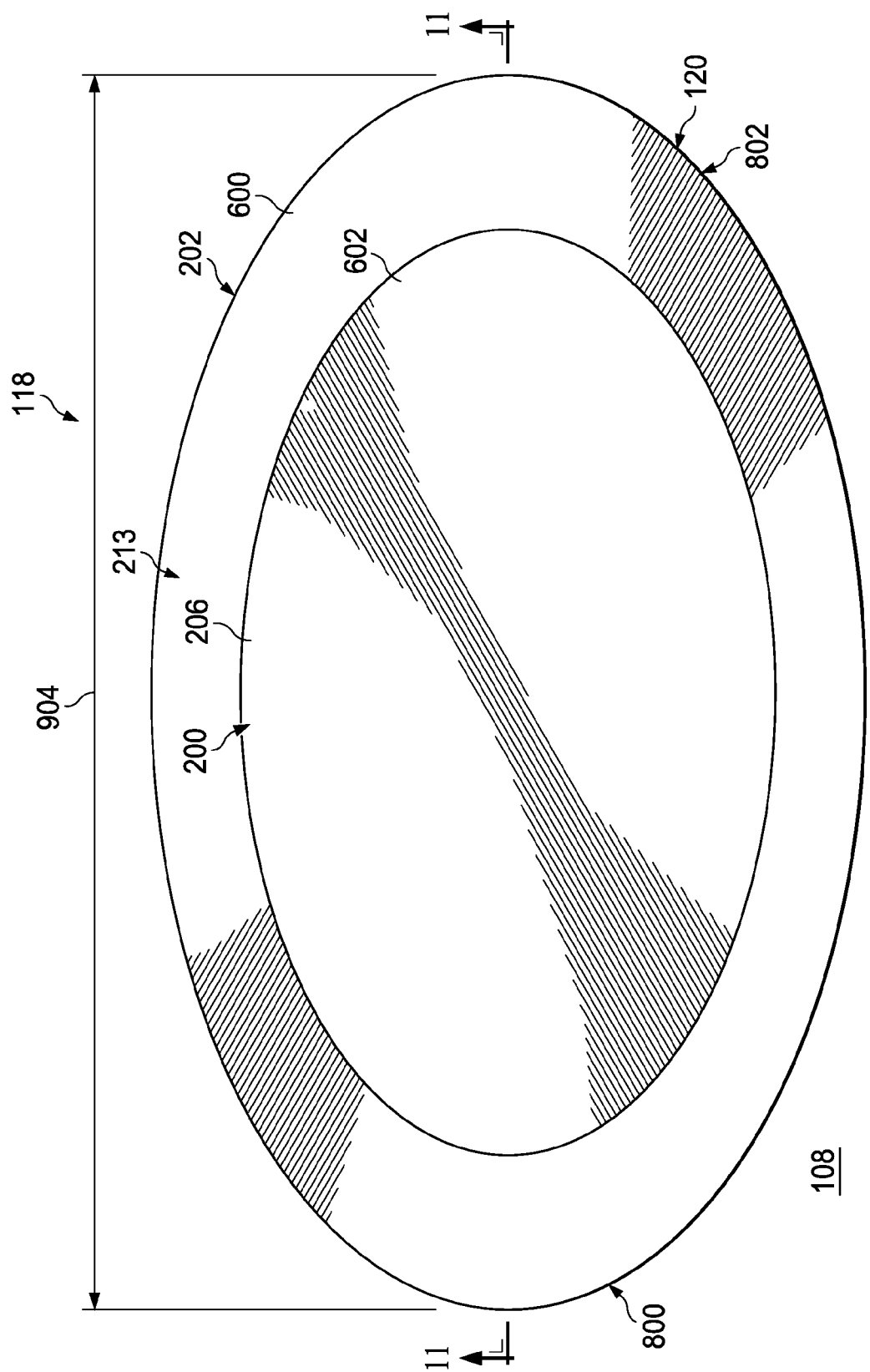
FIG. 10 is an illustration of a fastener system positioned in a hole in accordance with an illustrative embodiment.

In FIG. 10, an illustration of a fastener system positioned in a hole is depicted in accordance with an illustrative embodiment. In this depicted example, fastener system 118 is positioned in hole 120.

Fastener system 118 may be used to attach composite structure 108 to second structure 110 (not shown in this view) and reduce the spread of inconsistency 910 seen in FIG. 9 in composite structure 108. In this illustrative example, fastener system 118 may be referred to as a "plug" for hole 120.

Instead of patching the area, which may take more time than desired, fastener system 118 is used to rework hole 120. Fastener system 118 is tightened using nut 203 (not shown in this view) to secure composite structure 108 to second structure 110 in this illustrative example.

Figure 11:
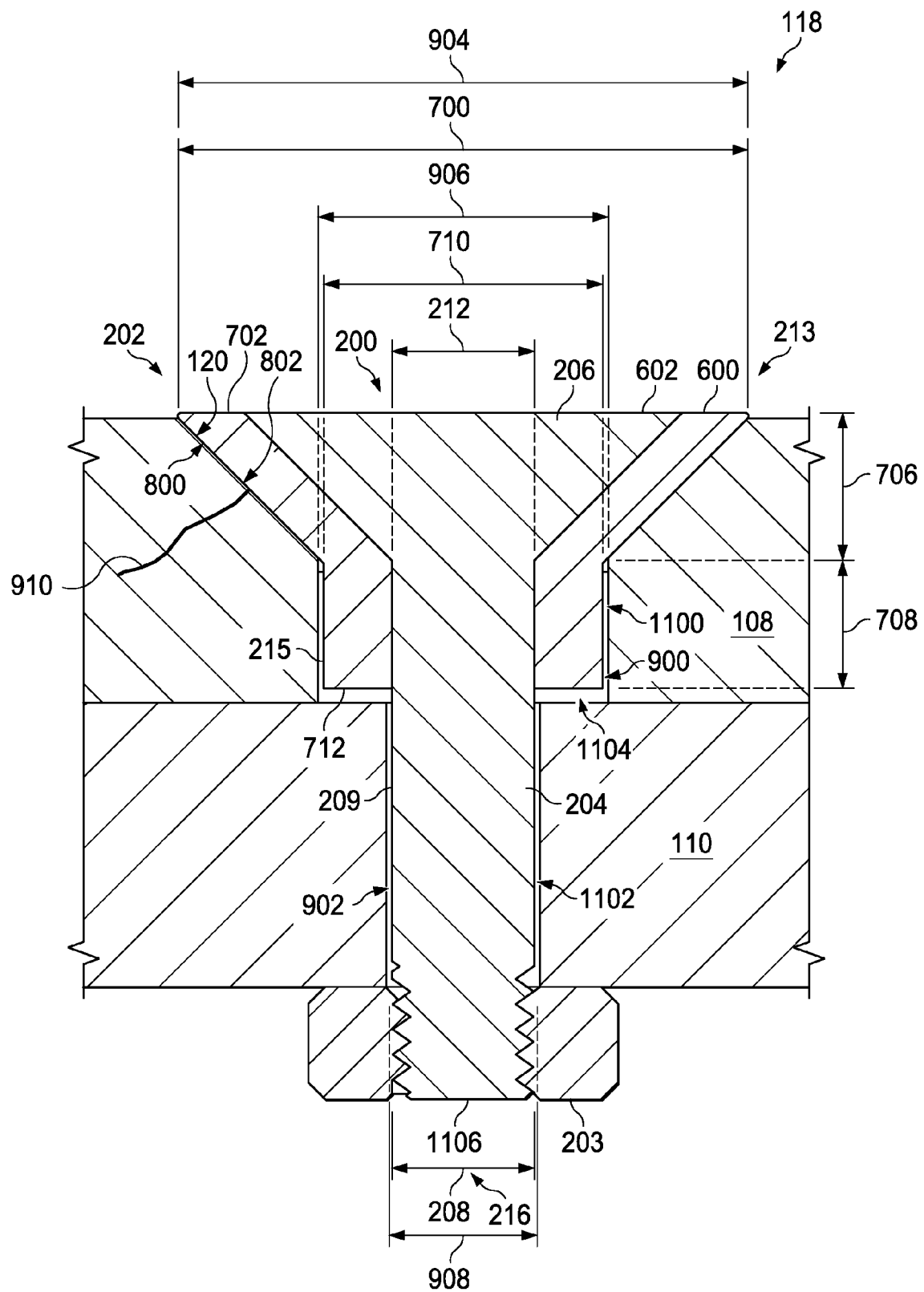
FIG. 11 is an illustration of a cross-sectional view of a hole with a fastener system in accordance with an illustrative embodiment.

Referring next to FIG. 11, an illustration of a cross-sectional view of a hole with a fastener system is depicted in accordance with an illustrative embodiment. In this depicted example, a cross-sectional view of fastener system 118 positioned in hole 120 taken along lines 11-11 in FIG. 10 is shown.

As depicted, fastener system 118 has been placed in hole 120 such that gap 1100 is present between outer surface 215 of section 708 of bushing 202 and inner surface 802 of hole 120 in composite structure 108. Outer surface 215 of section 706 of bushing 202 interfaces with inner surface 802 of countersink 800.

Gap 1102 is present between outer surface 209 of post 204 and inner surface 802 of hole 120 in second structure 110. Gap 1100 and gap 1102 are substantially the same size when fastener system 118 is positioned within hole 120. In other words, gap 1100 is substantially equal to gap 1102 within selected tolerances.

Gap 1100 and gap 1102 provide a desired amount of clearance for fastener system 118 in hole 120. This clearance may be selected based on the type of fastener used for fastener 200 or other suitable parameters. For example, without limitation, gap 1100 and gap 1102 may be about 0.0005 inches to about 0.0015 inches. In some illustrative examples, gap 1100 and gap 1102 may have other dimensions, depending on the particular implementation.

As illustrated, gap 1104 is present between second end 712 of bushing 202 and second structure 110. In one illustrative example, gap 1104 may be about 0.002 inches to about 0.005 inches. Gap 1104 is selected such that positive clamp up occurs when nut 203 is tightened on post 204 of fastener 200. In this illustrative example, positive clamp up refers to an exertion of pressure on composite structure 108 to compress composite structure 108. This compression reduces the spread of inconsistency 910.

In this depicted example, nut 203 has been placed on end 1106 of post 204 of fastener 200. As fastener system 118 is tightened with nut 203, gap 1104 will be reduced. As a result, composite structure 108 is clamped to second structure 110.

Figure 12:
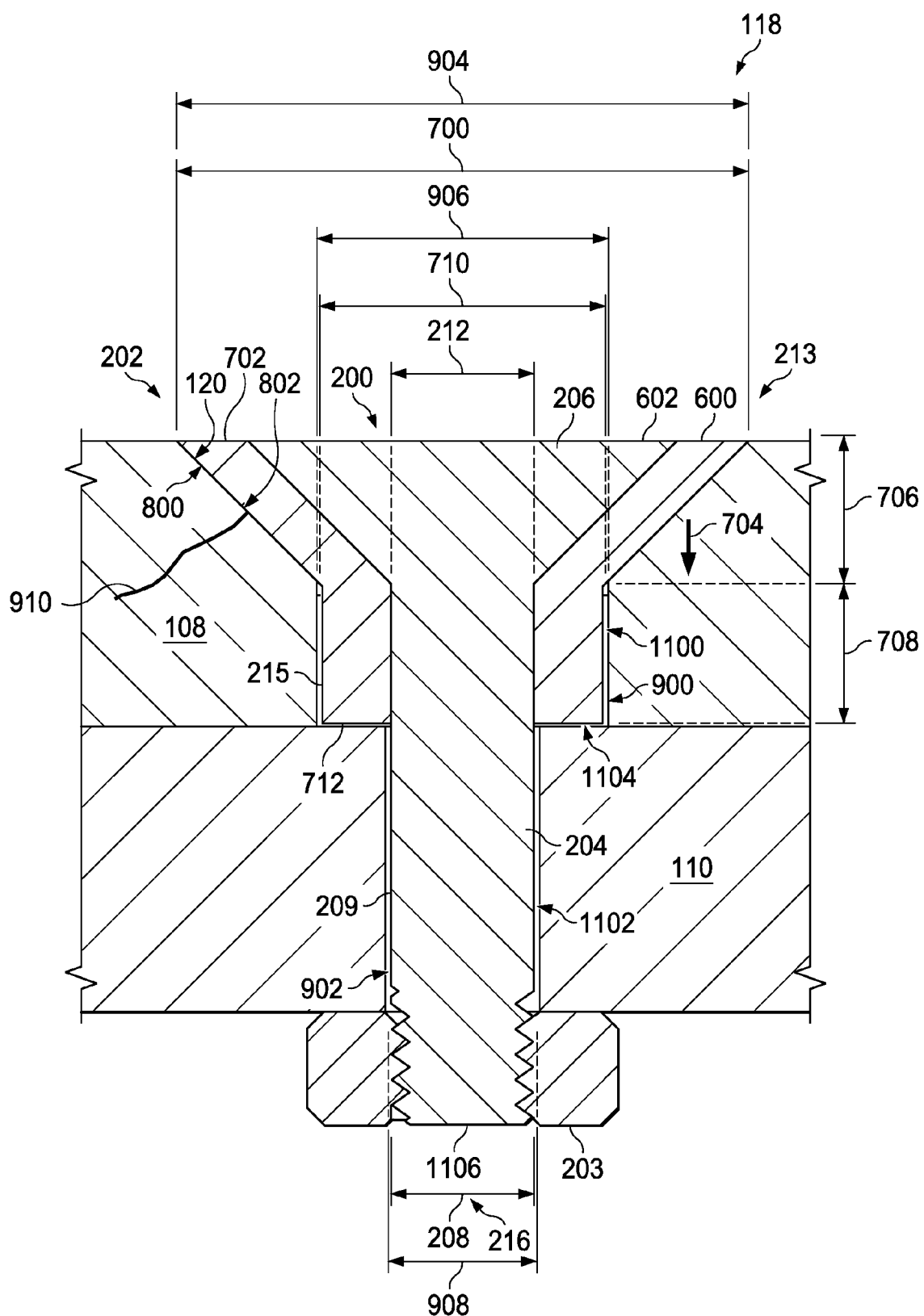
FIG. 12 is an illustration of a cross-sectional view of a fastener system in a hole in accordance with an illustrative embodiment.

Turning next to FIG. 12, an illustration of a cross-sectional view of a fastener system in a hole is depicted in accordance with an illustrative embodiment. In this depicted example, nut 203 has been tightened on post 204 of fastener 200.

Nut 203 has been tightened on post 204 of fastener 200 such that gap 1104 is reduced. In this illustrative example, gap 1104 is reduced such that a desired amount of space remains between second end 712 of bushing 202 and second structure 110. For instance, gap 1104 may be about 0.000 inches to about 0.003 inches when nut 203 is tightened. In one illustrative example, gap 1104 is reduced to about 0.002 inches to provide positive clamp up without loading second structure 110.

In other illustrative examples, gap 1104 may be more than 0.003 inches, depending on the particular implementation. In some cases, it may be desirable for gap 1104 not to exceed about 0.008 inches, the size of a layer of composite material in composite structure 108.

Section 706 of bushing 202 clamps down on countersink 800 of hole 120 in composite structure 108. In the illustrative example, this clamping reduces the risk of inconsistency 910 spreading in composite structure 108.

Additionally, this clamping reduces the risk of new inconsistencies forming within composite structure 108. For example, clamping composite structure 108 to second structure 110 reduces the risk of delamination occurring between layers of composite material in composite structure 108.

With the use of fastener system 118 in this manner, an interference fit is achieved between fastener 200 and bushing 202 without compromising composite structure 108. In other words, instead of installing bushing 202 in hole 120 and then forming an interference fit between fastener 200 with bushing 202, a desired interference fit is achieved without exerting additional force on composite structure 108 that could cause inconsistencies to form in composite structure 108.

Moreover, fastener system 118 provides an efficient way to reduce the spread of an inconsistency already present in composite structure 108. In this manner, fastener system 118 may be used to rework hole 120 in composite structure 108 without additional patching of hole 120 or performing other rework operations on composite structure 108.

Figure 13:
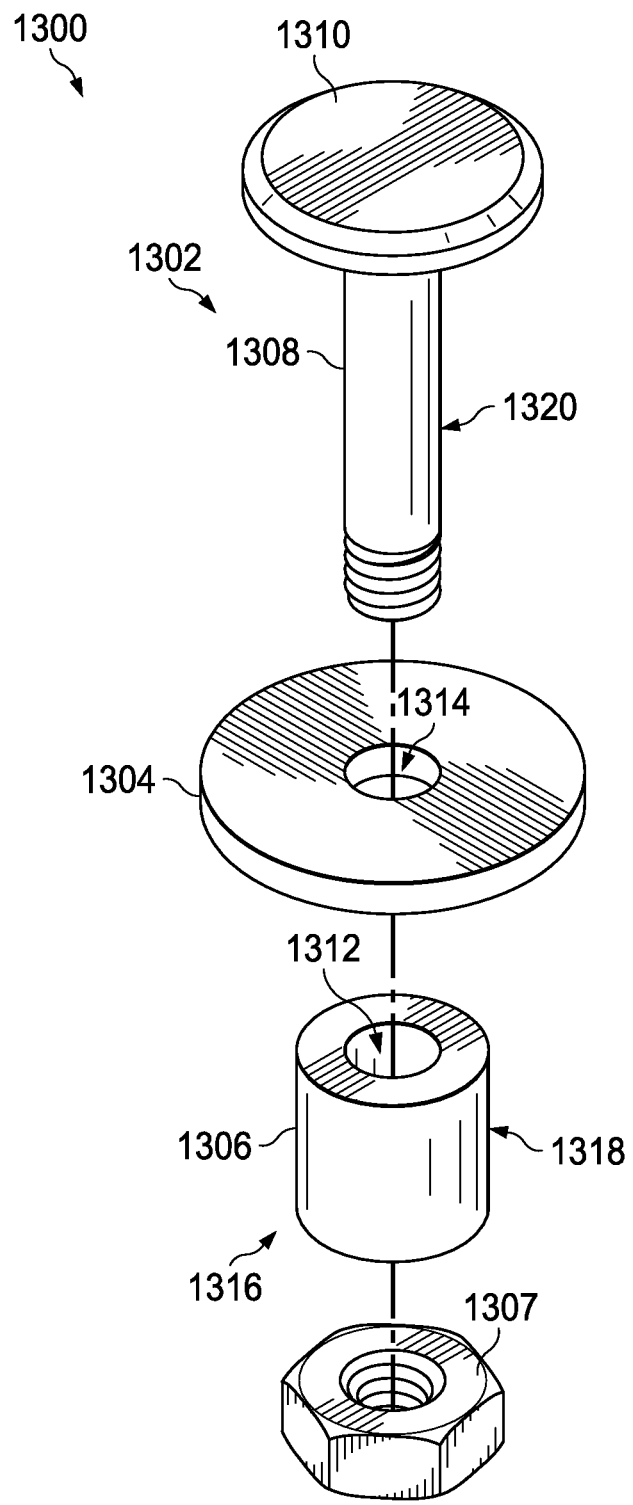
FIG. 13 is an illustration of an exploded view of another implementation for a fastener system in accordance with an illustrative embodiment.

Turning now to FIG. 13, an illustration of an exploded view of another implementation for a fastener system is depicted in accordance with an illustrative embodiment. In this depicted example, fastener system 1300 includes fastener 1302, washer 1304, bushing 1306, and nut 1307. Fastener system 1300 is another example of a fastener system that may be used to attach a composite structure to a second structure.

As depicted, fastener 1302 has post 1308 and head 1310. Bushing 1306 has channel 1312. Post 1308 of fastener 1302 forms an interference fit with channel 1312 of bushing 1306.

In this illustrative example, washer 1304 is a mechanical device configured to distribute the load between fastener 1302 and nut 1307 used to clamp the composite structure and the second structure together. Washer 1304 has channel 1314. Post 1308 is received by channel 1314 in washer 1304 prior to forming an interference fit with bushing 1306.

As illustrated, bushing 1306 has shape 1316. Shape 1316 is a cylindrical shape that corresponds to the shape of a hole in the composite structure. Outer surface 1318 of bushing 1306 interfaces with the inner surface of the hole in the composite structure, while outer surface 1320 of post 1308 of fastener 1302 interfaces with the inner surface of the hole in the second structure.

In this illustrative example, a cooling system may be used to cool fastener 1302 such that post 1308 fits more easily in channel 1312 of bushing 1306. In another illustrative example, bushing 1306 may be heated using a heating system to increase the diameter of channel 1312.

Fastener 1302 forms an interference fit with bushing 1306 in the same manner as described with reference to FIG. 5, above. In this illustrative example, head 1310 of fastener 1302 does not lie flush with bushing 1306.

Figure 14:
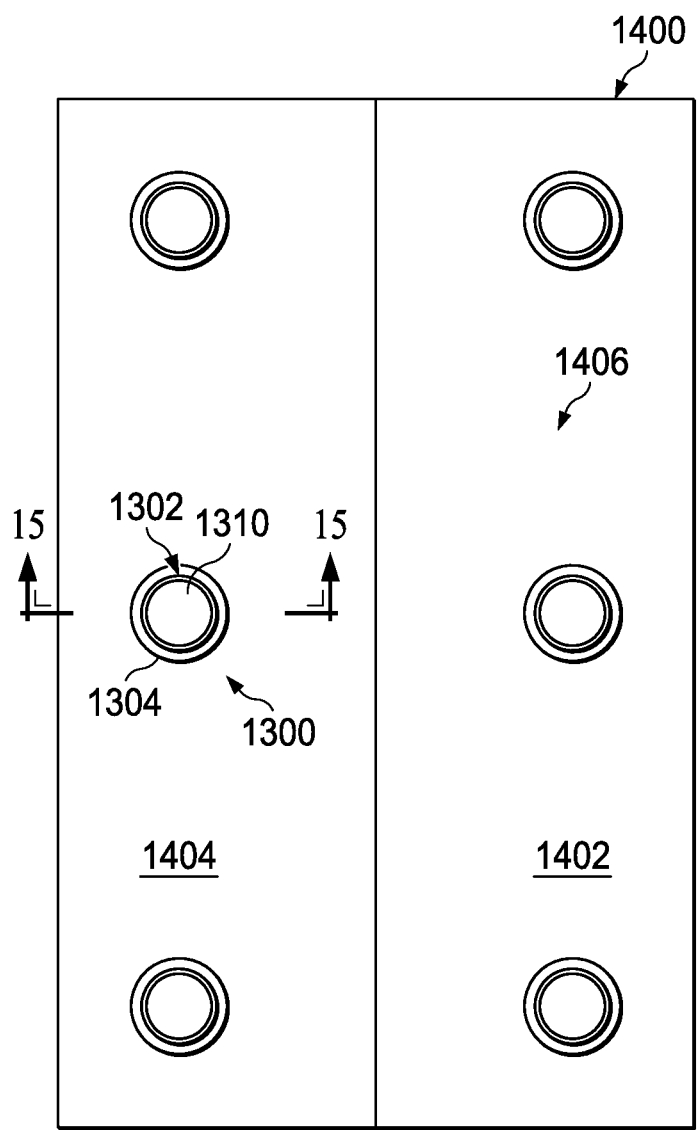
FIG. 14 is an illustration of a joint between a composite structure and a second structure in accordance with an illustrative embodiment.

In FIG. 14, an illustration of a joint between a composite structure and a second structure is depicted in accordance with an illustrative embodiment. In this depicted example, fastener systems 1400 are used to join panel 1402 and panel 1404 at joint 1406.

Panel 1402 and panel 1404 are composite structures in this illustrative example. Fastener system 1300 has been positioned in a hole (not shown in this view) drilled through panel 1402 and panel 1404.

Figure 15:
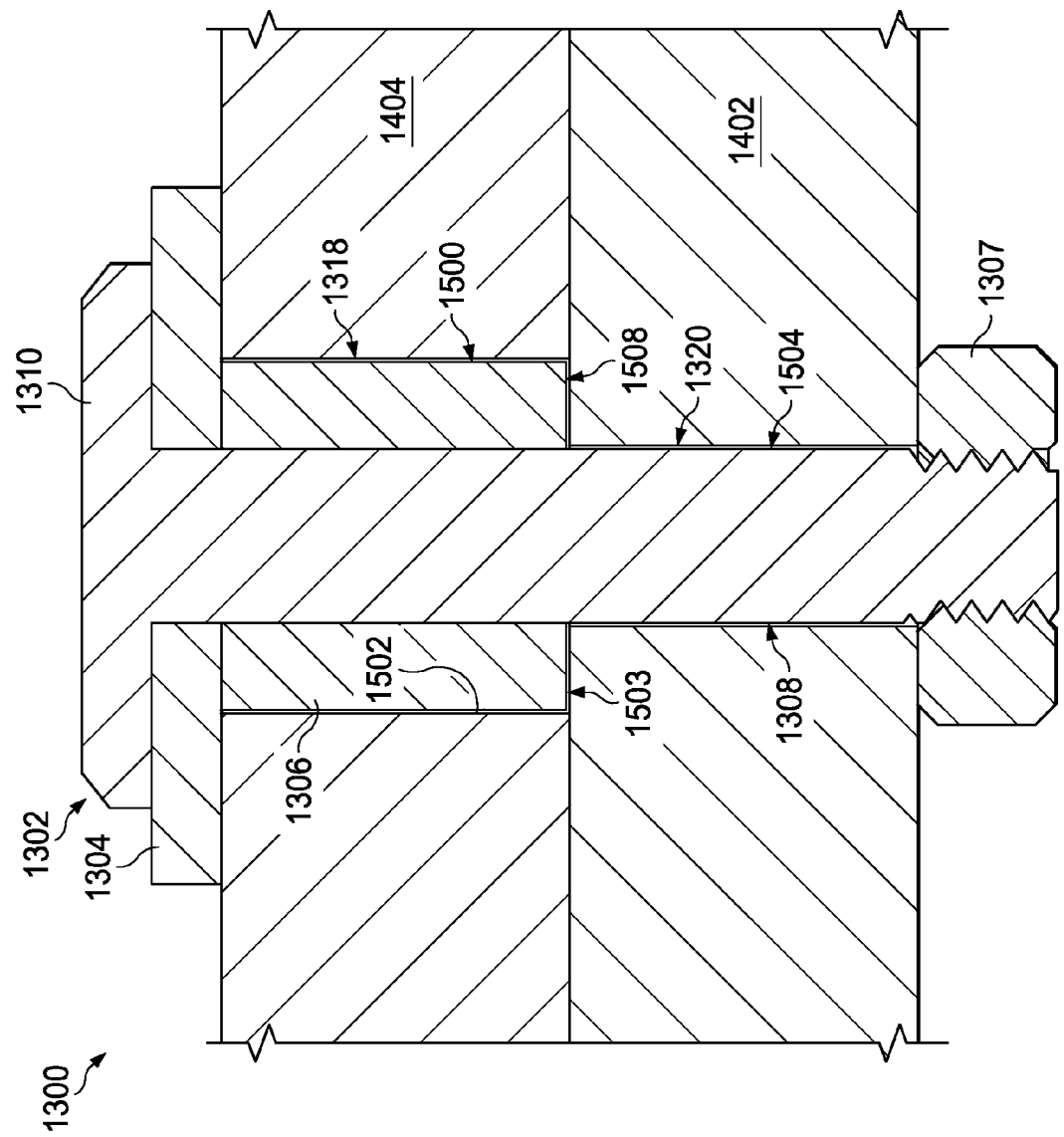
FIG. 15 is an illustration of a cross-sectional view of a fastener system installed in a hole in accordance with an illustrative embodiment.

With reference next to FIG. 15, an illustration of a cross-sectional view of a fastener system installed in a hole is depicted in accordance with an illustrative embodiment. In this depicted example, a cross-sectional view of fastener system 1300 installed in a hole taken along lines 15-15 in FIG. 14 is shown.

As depicted, gap 1500 is present between outer surface 1318 of bushing 1306 and inner surface 1502 of hole 1503 in panel 1404. Gap 1504 is present between outer surface 1320 of post 1308 and inner surface 1502 of hole 1503 in panel 1402. Gap 1500 and gap 1504 are substantially the same size.

In this illustrative example, nut 1307 has been placed on post 1308 and tightened. The tightening of nut 1307 clamps panel 1404 and panel 1402 together. In particular, the tightening of nut 1307 causes washer 1304 to apply a force to panel 1404 to clamp down panel 1404 against panel 1402. The space present between end 1508 of bushing 1306 and panel 1402 has been reduced in this illustrative example. In this manner, positive clamp up occurs. Fastener system 1300 is used to attach panel 1404 with panel 1402 while reducing the risk of an inconsistency forming in panel 1404, panel 1402, or both.

The illustrations of fastener system 118 shown in FIGS. 1-12 and fastener system 1300 shown in FIGS. 13-16 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, cooling system 124 may take other forms other than liquid nitrogen 302 in chamber 300 as shown in FIG. 3. For instance, fastener 200 may be placed in a refrigeration unit. In other illustrative examples, fastener 200 may be placed in a cooler of dry ice.

As another example, fastener system 118 with nut 203 may be used to join more than two structures together at joint 111. For instance, three structures, four structures, or some other number of structures may be joined together at joint 111.

In still other illustrative examples, additional operations may be performed on at least one of hole 120 or fastener system 118 before positioning fastener system 118 in hole 120. For instance, outer surface 215 of bushing 202 may be smoothed prior to positioning fastener system 118 in hole 120. In another illustrative example, hole 120 is deburred prior to positioning fastener system 118 in hole 120.

In still another example, when reworking hole 120, paint or other types of coating may be removed from surfaces surrounding hole 120. In yet another illustrative example, an adhesive may be used within countersink 800 to further secure bushing 202 within hole 120.

In still other illustrative examples, fastener system 118 is secured using components other than nut 203. For example, without limitation, fastener system 118 may be secured using a threaded collar or other threaded device. When fastener 200 is a lockbolt, a swage collar may be used. In other illustrative examples, a twist off collar may be used. In this case, the hex may break off at a predetermined torque.

In yet another illustrative example, fastener system 118 may be manufactured in one piece. In this case, cooling system 124 and heating system 126 are not needed to interference fit a fastener with a bushing. Instead, the one-piece structure is positioned in hole 120 and tightened in the manner described in FIGS. 10-12, above.

Figure 16:
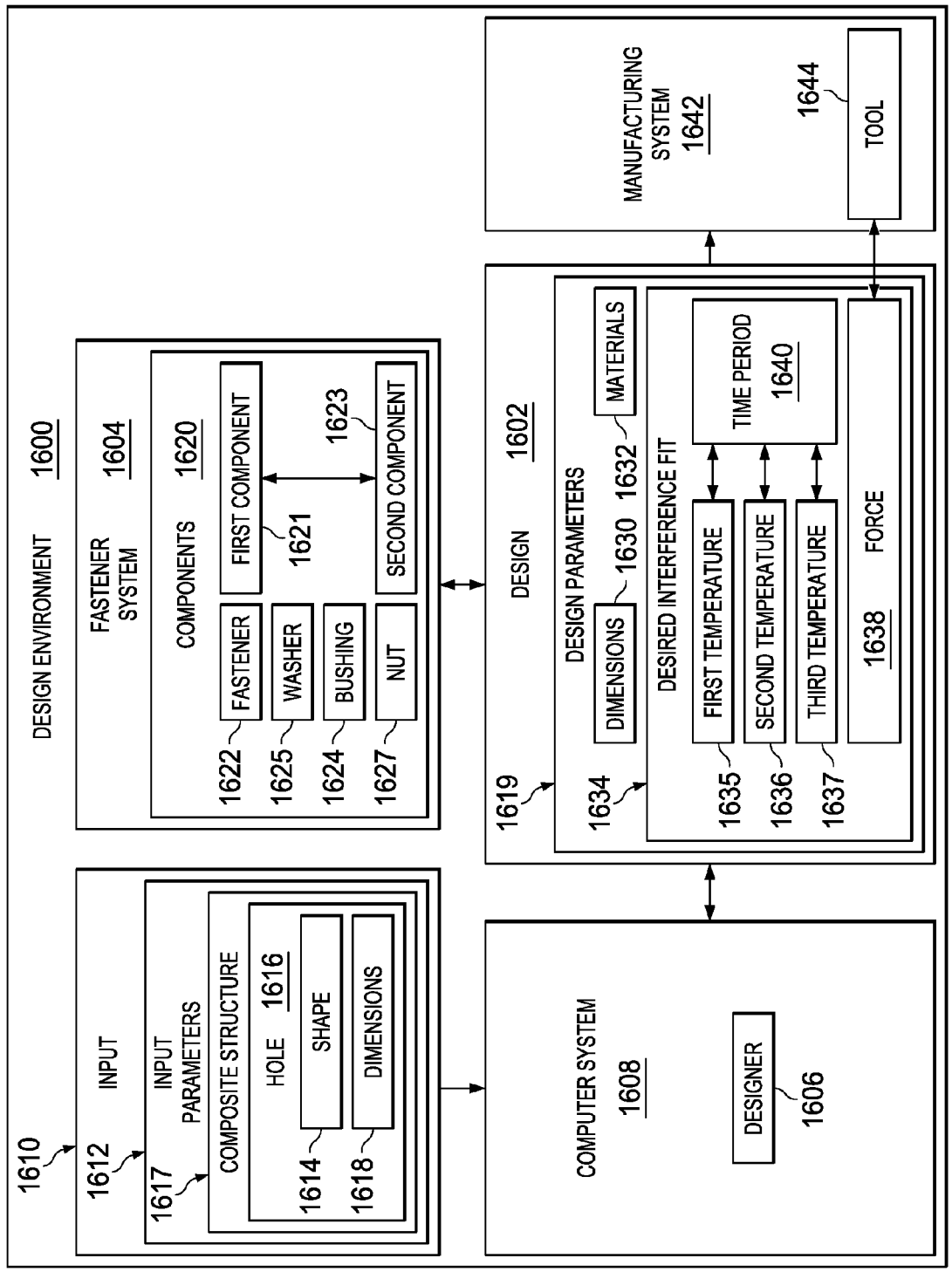
FIG. 16 is an illustration of a block diagram of a design environment in accordance with an illustrative embodiment.

Turning next to FIG. 16, an illustration of a block diagram of a design environment is depicted in accordance with an illustrative embodiment. As depicted, design environment 1600 generates design 1602 for fastener system 1604 and also may be used to manufacture fastener system 1604. Fastener system 118 shown in FIGS. 1-12 is an example of a physical implementation for fastener system 1604 shown in this figure.

In the illustrative example, designer 1606 is configured to generate design 1602 and may be implemented in software, hardware, firmware or a combination thereof. When software is used, the operations performed by designer 1606 may be implemented in program code configured to run on a processor unit. When firmware is used, the operations performed by designer 1606 may be implemented in program code as data and stored in persistent memory to run on a processor unit. When hardware is employed, the hardware may include circuits that operate to perform the operations by designer 1606.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components, integrated with inorganic components, comprised entirely of organic components excluding a human being, or a combination thereof. For example, the processes may be implemented as circuits in organic semiconductors.

In this illustrative example, designer 1606 is located in computer system 1608. Computer system 1608 is comprised of a number of computers. When more than one computer is present in computer system 1608, those computers may communicate with each other through a communications medium such as a network.

As depicted, designer 1606 receives input 1610 for use in generating design 1602 for fastener system 1604. For example, input 1610 includes input parameters 1612.

Input parameters 1612 describe, for example, shape 1614 of hole 1616 in composite structure 1617, dimensions 1618 of hole 1616 in composite structure 1617, and other suitable parameters. As an example, input parameters 1612 include a desired shape for a countersink in hole 1616 in composite structure 1617 in which fastener system 1604 is to be placed. As another example, input parameters 1612 include a diameter for each portion of hole 1616. As yet another example, input parameters 1612 include a depth for hole 1616 in composite structure 1617 and a second structure to be joined with composite structure 1617.

Using input 1610, designer 1606 generates design 1602. In particular, designer 1606 generates design parameters 1619 for fastener system 1604.

As depicted, design parameters 1619 include various parameters. For example, design parameters 1619 may describe components 1620 in fastener system 1604. Components 1620 may include first component 1621 and second component 1623. First component 1621 and second component 1623 may be selected from one of fastener 1622 and bushing 1624. First component 1621 forms an interference fit with second component 1623. In some examples, components 1620 also include washer 1625 and nut 1627.

As illustrated, design parameters 1619 include at least one of dimensions 1630, materials 1632, desired interference fit 1634, or other suitable parameters to describe the various components in fastener system 1604. For example, dimensions 1630 and materials 1632 may be used to customize bushing 1624 in a manner that is desired for fastener system 1604 to fit within hole 1616 in composite structure 1617 with a desired amount of clearance.

As an example, dimensions 1630 may be used to describe a shape for bushing 1624 that corresponds to shape 1614 of hole 1616 in composite structure 1617. Dimensions 1630 also comprise an identification of dimensions for fastener 1622 including post length, head shape, post diameter, and other suitable parameters.

In this depicted example, materials 1632 are used to describe materials for bushing 1624, fastener 1622, or both. Materials 1632 may be selected for each of fastener 1622 and bushing 1624 based on desired physical properties, resistance to different types of loads, coefficients of thermal expansion, and other factors.

In this illustrative example, desired interference fit 1634 describes the interference fit between fastener 1622 and bushing 1624. Desired interference fit 1634 is achieved by changing the temperature of fastener 1622, bushing 1624, or both. Parameters useful to achieve desired interference fit 1634 include first temperature 1635, second temperature 1636, third temperature 1637, force 1638, and time period 1640.

In this illustrative example, first temperature 1635 may be an ambient temperature at which fastener 1622 has a first diameter. A channel in bushing 1624 has a first diameter at first temperature 1635. Second temperature 1636 is a temperature at which fastener 1622 is cooled to decrease the diameter of its post by a desired amount. Third temperature 1637 is a temperature at which bushing 1624 is heated to increase the size of the channel in bushing 1624. Second temperature 1636 and third temperature 1637 are selected based on the type of material for fastener 1622 and bushing 1624, respectively.

As depicted, force 1638 is a force needed to press the post of fastener 1622 into the channel of bushing 1624. Force 1638 may be a force exerted on the head of fastener 1622 by a press tool.

In this depicted example, time period 1640 represents the time period for cooling of fastener 1622 to reach the desired diameter of the post. Time period 1640 also represents the time period for heating bushing 1624 to reach the desired diameter of the channel.

Design 1602 may be used by manufacturing system 1642 to manufacture fastener system 1604. Specifically, tool 1644 in manufacturing system 1642 is used to manufacture fastener system 1604. Tool 1644 may be a press in this illustrative example. Once fastener system 1604 is manufactured, fastener system 1604 is used to attach composite structure 1617 to a second structure. A human operator may place fastener system 1604 in hole 1616 in composite structure 1617, tighten down fastener system 1604 using a nut, or both. In other instances, a tool, robotic device, or other device may be used.

The illustrations of design environment 1600 and the components within design environment 1600 in FIG. 16 are not meant to imply physical or architectural limitations to the manner in which an illustrative embodiment may be implemented. Other components in addition to or in place of the ones illustrated may be used. Some components may be optional.

The different components shown in FIGS. 1-15 may be illustrative examples of how components shown in block form in FIG. 16 can be implemented as physical structures. Additionally, some of the components in FIGS. 1-15 may be combined with components in FIG. 16, used with components in FIG. 16, or a combination of the two.

For example, in some cases, tool 1644 may not be needed to insert the post of fastener 1622 into the channel of bushing 1624. In other illustrative examples, design parameters 1619 also may include a desired level of torque needed to properly tighten nut 1627 on the post of fastener 1622. In still other illustrative examples, manufacturing system 1642 may perform other operations such as drilling hole 1616, deburring hole 1616, forming a countersink in hole 1616, other suitable operations, or a combination thereof.

Figure 17:
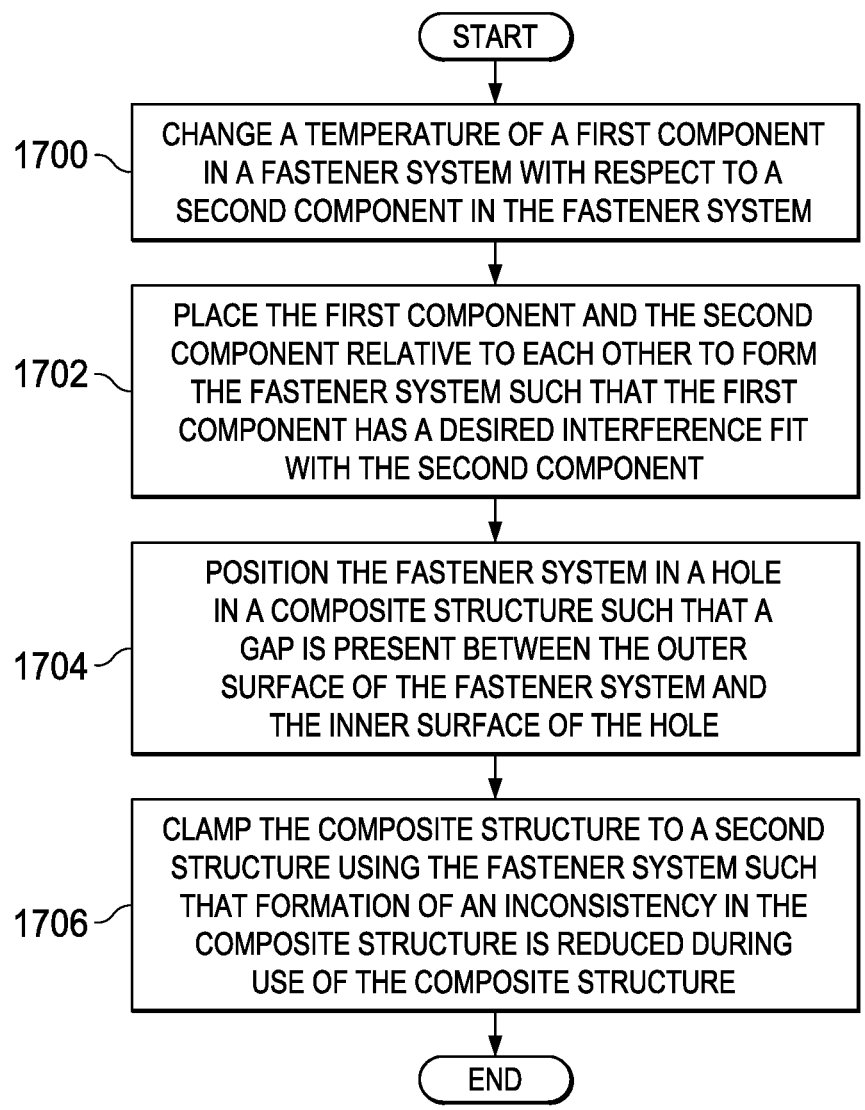
FIG. 17 is an illustration of a flowchart of a process for installing a fastener system in accordance with an illustrative embodiment.

With reference now to FIG. 17, an illustration of a flowchart of a process for installing a fastener system is depicted in accordance with an illustrative embodiment. The process illustrated in FIG. 17 may be implemented in design environment 1600 in FIG. 16. In particular, the process may be used to form fastener system 1604 from fastener 1622 and bushing 1624 in FIG. 16.

The process begins by changing a temperature of a first component in a fastener system with respect to a second component in the fastener system (operation 1700). For example, the first component may be cooled to shrink the first component to fit within the second component. As another example, the first component can be heated to increase the size of the first component to fit the second component within the first component.

The process then places the first component and the second component relative to each other to form the fastener system such that the first component has a desired interference fit with the second component (operation 1702). Next, the process positions the fastener system in a hole in a composite structure such that a gap is present between the outer surface of the fastener system and the inner surface of the hole (operation 1704).

The process then clamps the composite structure to a second structure using the fastener system such that formation of an inconsistency in the composite structure is reduced during use of the composite structure (operation 1706) with the process terminating thereafter. Clamping the composite structure and the second structure together also reduces the risk of an inconsistency forming during installation of the fastener system, as the force needed to form an interference fit between the first component and the second component occurs before the fastener system is positioned in the hole.

Figure 18:
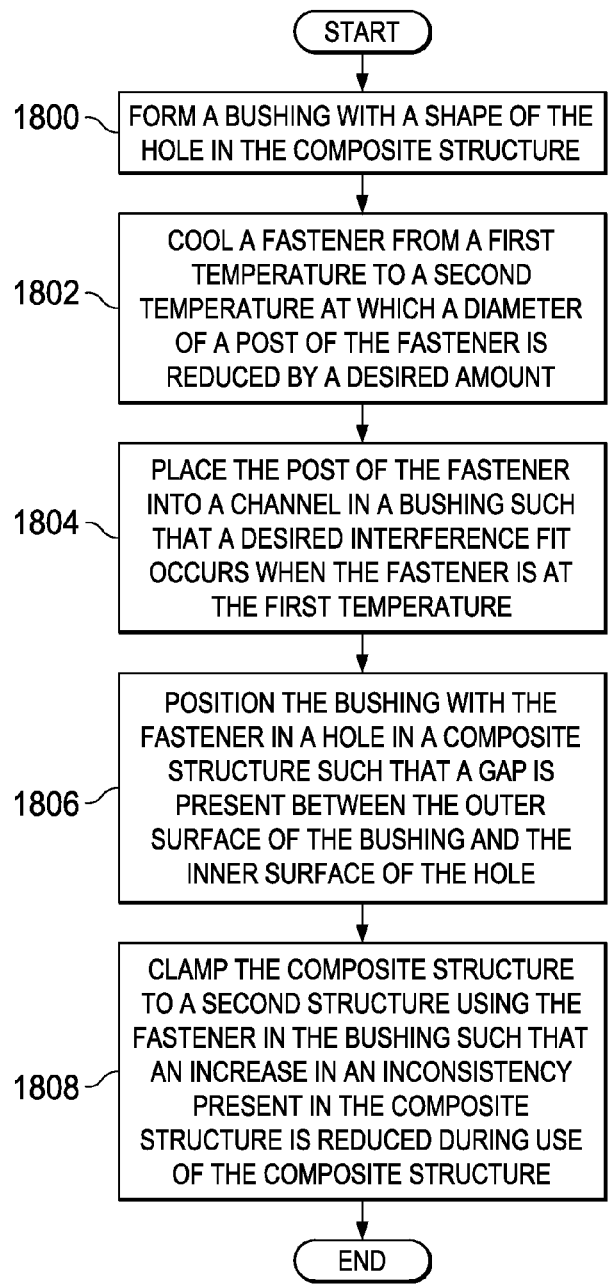
FIG. 18 is an illustration of a flowchart of a process for reworking a composite structure in accordance with an illustrative embodiment.

In FIG. 18, an illustration of a flowchart of a process for reworking a composite structure is depicted in accordance with an illustrative embodiment. The process illustrated in FIG. 18 may be implemented in design environment 1600 to form fastener system 1604 forming an interference fit between fastener 1622 and bushing 1624 in FIG. 16. Fastener system 1604 may then be used to rework composite structure 1617. Composite structure 1617 may need to be reworked when an inconsistency is present in composite structure 1617.

The process begins by forming a bushing with a shape of the hole in the composite structure (operation 1800). The diameter of the bushing may be smaller than the diameter of the hole such that a desired amount of clearance is achieved when the bushing is positioned in the hole. The shape of the bushing may include a shape of the hole with a countersink.

Next, the process cools a fastener from a first temperature to a second temperature at which a diameter of a post of the fastener is reduced by a desired amount (operation 1802). The process then places the post of the fastener into a channel in a bushing such that a desired interference fit occurs when the fastener is at the first temperature (operation 1804).

The post of the fastener may be positioned in the channel of the bushing by applying a force to the fastener, prior to positioning the bushing with the fastener in the hole in the composite structure, such that the post of the fastener is pressed into the channel of the bushing to achieve a desired interference fit. In some instances, a washer may be positioned between a first surface of the bushing and a second surface of a head of a fastener.

Next, the process positions the bushing with the fastener in a hole in a composite structure such that a gap is present between the outer surface of the bushing and the inner surface of the hole (operation 1806). The process then clamps the composite structure to a second structure using the fastener in the bushing such that an increase in an inconsistency present in the composite structure is reduced during use of the composite structure (operation 1808) with the process terminating thereafter. This clamping reduces a gap present between an end of the bushing and the second structure.

In some cases, the clamping also reduces the risk of additional inconsistencies forming in the composite structure. For instance, the clamping may reduce the risk of delamination between layers of composite material in the composite structure.

Figure 19:
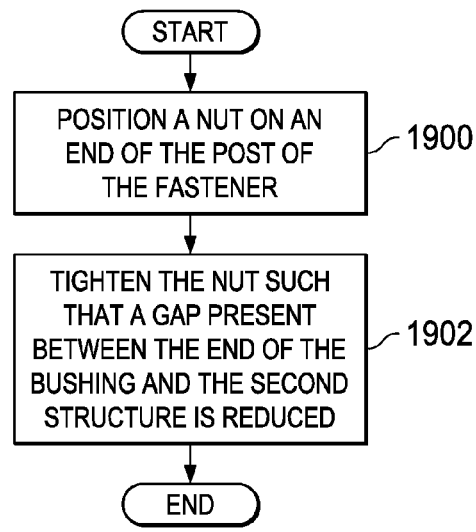
FIG. 19 is an illustration of a flowchart of a process for clamping a composite structure to a second structure using a fastener system in accordance with an illustrative embodiment.

Referring next to FIG. 19, an illustration of a flowchart of a process for clamping a composite structure to a second structure using a fastener system is depicted in accordance with an illustrative embodiment. The process illustrated in FIG. 19 may be implemented during operation 1806 in FIG. 18.

The process begins by positioning a nut on an end of the post of the fastener (operation 1900). Next, the process tightens the nut such that a gap present between the end of the bushing and the second structure is reduced (operation 1902) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 20:
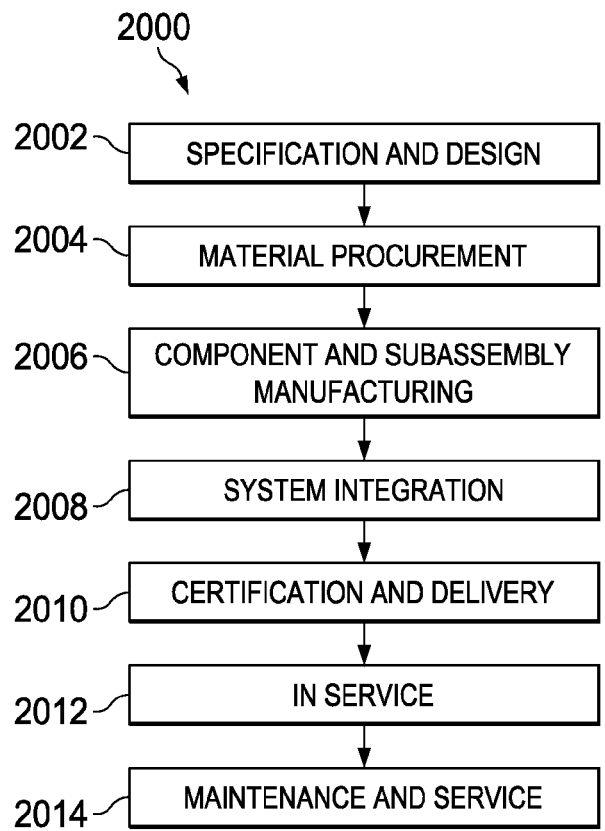
FIG. 20 is an illustration of an aircraft manufacturing and service method in the form of a block diagram in accordance with an illustrative embodiment.
Figure 21:
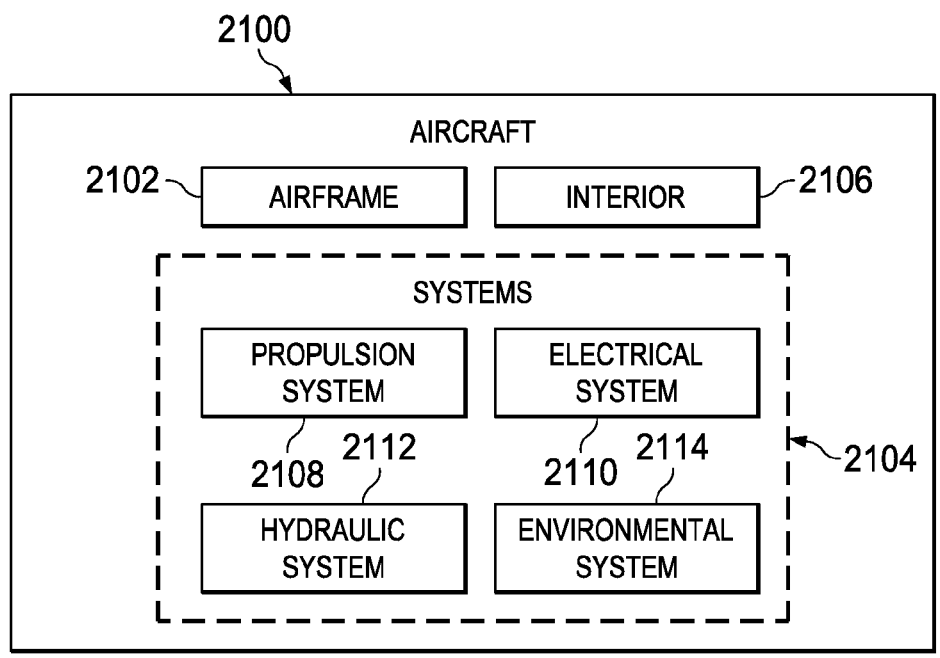
FIG. 21 is an illustration of an aircraft in the form of a block diagram in which an illustrative embodiment may be implemented.

Illustrative embodiments of the disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in the form of a block diagram in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 may go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in the form of a block diagram in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2000 in FIG. 20. In particular, fastener system 1604 from FIG. 16 may be formed and used to clamp a composite structure to a second structure in aircraft 2100 during any one of the stages of aircraft manufacturing and service method 2000. For example, without limitation, fastener system 118 may be used to clamp composite structure 108 and second structure 110 together during at least one of component and subassembly manufacturing 2006, system integration 2008, routine maintenance and service 2014, or some other stage of aircraft manufacturing and service method 2000.

In an illustrative example, fastener system 118 is used to rework a hole in a composite structure in aircraft 2100 that was drilled too large for a fastener. As another example, fastener system 118 may reduce the risk of delamination forming between holes drilled close together.

In an illustrative example, components or subassemblies produced in component and subassembly manufacturing 2006 in FIG. 20 may be fabricated or manufactured in a manner similar to components or subassemblies produced while aircraft 2100 is in service 2012 in FIG. 20. As yet another example, one or more apparatus embodiments, method embodiments, or a combination thereof may be utilized during production stages, such as component and subassembly manufacturing 2006 and system integration 2008 in FIG. 20. One or more apparatus embodiments, method embodiments, or a combination thereof may be utilized while aircraft 2100 is in service 2012, during maintenance and service 2014 in FIG. 20, or a combination thereof. The use of a number of the different illustrative embodiments may substantially expedite the assembly, reduce the cost of aircraft 2100, or both.

Thus, the illustrative embodiments provide a method and apparatus for reworking composite structure 108 when an inconsistency is present in composite structure 108. This method and apparatus is also used to install fastener system 118 in composite structure 108 when an inconsistency may not be present. Fastener 200 is cooled from a first temperature to a second temperature at which diameter 208 of post 204 of fastener 200 is reduced by a desired amount. Post 204 of fastener 200 is placed into channel 210 in bushing 202 such that a desired interference fit occurs when fastener 200 is at the first temperature. Bushing 202 with fastener 200 is positioned in hole 120 in composite structure 108. Gap 1100 is present between outer surface 215 of bushing 202 and inner surface 802 of hole 120.

With the use of fastener system 118, the time needed to rework a composite structure when inconsistencies develop in the composite structure may be reduced. As an example, when an inconsistency develops near a hole in a composite structure, fastener system 118 is used to plug the hole without increasing the inconsistency in the composite structure. Fastener system 118 is installed without extensive rework of the composite structure, scarfing the composite structure, or performing other operations on the composite structure.

Additionally, if a hole in a composite structure is drilled larger than desired, the diameter of fastener system 118 may be adjusted such that fastener system 118 fills the hole. As a result, the illustrative embodiments increase the speed at which an inconsistency located near a fastener hole in the composite structure is reworked, both saving time and reducing cost.

Since fastener 200 forms an interference fit with bushing 202 prior to placing these components into the hole, the formation of inconsistencies in the composite structure are further reduced. Instead of using a press or other tool to force fastener 200 into a bushing already installed in the composite structure, fastener system 118 is manufactured prior to being positioned in the hole.

Further, when nut 203 is positioned on the end of fastener 200 and tightened, fastener system 118 clamps the composite structure and the second structure to prevent delamination from spreading through the composite structure. An operator may select a desired level of torque needed to clamp the composite structure with the second structure to properly rework the composite structure. The method and apparatus described herein is customizable based on the type of material, dimensions, surfaces, and other parameters of fastener 200, bushing 202, the size of the hole, or other suitable components.

With the use of an illustrative embodiment, operators may avoid extensive rework and discarding of the composite structures. Additionally, repairs using fastener system 118 may provide substantially the same structural integrity of the composite structure, within desired tolerances, as a composite structure without an inconsistency present.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for reworking a composite structure, the method comprising:

cooling a fastener from a first temperature to a second temperature at which a diameter of a post of the fastener is reduced by a desired amount;

placing the post of the fastener into a channel in a bushing such that a desired interference fit occurs when the fastener is at the first temperature;

positioning the bushing with the fastener in a hole in the composite structure, wherein a gap is present between an outer surface of the bushing and an inner surface of the hole;

positioning a nut on an end of the post of the fastener; and tightening the nut to reduce a gap present between the end of the bushing and a second structure such that a desired amount of space remains between an end of the bushing and the second structure.

2. The method of claim 1 further comprising: placing the post of the fastener through a hole in the second structure, wherein the gap provides a clearance that is substantially equal to a clearance between an outer surface of the post of the fastener and the inner surface of the hole in the second structure.

3. The method of claim 1 further comprising: clamping the composite structure to the second structure using the fastener in the bushing such that formation of an inconsistency in the composite structure is reduced during use of the composite structure.

4. The method of claim 1 further comprising: clamping the composite structure to the second structure using the fastener in the bushing such that an increase in an inconsistency present in the composite structure is reduced during use of the composite structure.

5. The method of claim 1 further comprising:

positioning a washer between a first surface of the bushing and a second surface of a head of the fastener.

6. The method of claim 1, wherein the hole includes a countersink and further comprising:

forming the bushing with a shape of the hole with the countersink.

7. The method of claim 1 further comprising:

applying a force to the fastener prior to positioning the bushing with the fastener in the hole in the composite structure, such that the post of the fastener is pressed into the channel of the bushing to achieve the desired interference fit.

8. The method of claim 1, wherein the composite structure comprises layers of composite material, the method further comprising: reducing the gap present between the end of the bushing and the second structure such that the desired amount of space remaining between the end of the bushing and the second structure is less that a ply thickness of a layer of the layers of composite material.

9. The method of claim 1, wherein the composite structure comprises layers of composite material, the method further comprising: reducing the gap present between the end of the bushing and the second structure such that the desired amount of space remaining between the end of the bushing and the second structure is between an amount selected from about 0.002 inches to about 0.008 inches.

10. A method for installing a fastener system, the method comprising:

changing a temperature of a first component in the fastener system with respect to a second component in the fastener system;

placing the first component and the second component relative to each other to form the fastener system such that the first component has a desired interference fit with the second component;

positioning the fastener system in a hole in a composite structure, wherein a gap is present between an outer surface of the fastener system and an inner surface of the hole;

positioning a nut on an end of the post of the first component; and tightening the nut to reduce a gap present between the end of the first component and a second structure such that a desired amount of space remains between an end of the first component and the second structure.

11. The method of claim 10, wherein the first component is a fastener and changing the temperature of the fastener comprises:

cooling the fastener from a first temperature to a second temperature at which a diameter of a post of the fastener is reduced by a desired amount.

12. The method of claim 10, wherein the second component is a bushing and changing the temperature of the bushing comprises:

heating the bushing from a first temperature to a third temperature such that a diameter of a channel in the bushing is increased.

13. The method of claim 10 further comprising: clamping the composite structure to the second structure using the fastener system such that formation of an inconsistency in the composite structure is reduced during use of the composite structure.

14. The method of claim 10, wherein the composite structure comprises layers of composite material, the method further comprising: reducing the gap present between the end of the first component and the second structure such that the desired amount of space remaining between the end of the first component and the second structure is less that a ply thickness of a layer of the layers of composite material.

15. The method of claim 10, wherein the composite structure comprises layers of composite material, the method further comprising: reducing the gap present between the end of the first component and the second structure such that the desired amount of space remaining between the end of the first component and the second structure is between an amount selected from about 0.002 inches to about 0.008 inches.

* * * * *